(12) United States Patent  (10) Patent No.: US 6,744,033 B2
Ikeda                       (45) Date of Patent:     Jun. 1, 2004

(54) BAR-SHAPED LIGHT GUIDE, LINE-ILLUMINATING DEVICE INCORPORATED WITH THE BAR-SHAPED LIGHT GUIDE AND CONTACT-TYPE IMAGE SENSOR INCORPORATED WITH THE LINE-ILLUMINATING DEVICE

(75) Inventor: Makoto Ikeda, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 115 days.

(21) Appl. No.: 09/915,643

(22) Filed: Jul. 26, 2001

(65) Prior Publication Data
US 2002/0017600 A1 Feb. 14, 2002

(30) Foreign Application Priority Data

Aug. 1, 2000  (JP) .......................... 2000-232557
Aug. 9, 2000  (JP) .......................... 2000-240559
Jun. 5, 2001  (JP) .......................... 2001-169298

(51) Int. Cl.$^7$ ................................ H01J 3/14
(52) U.S. Cl. .................. 250/216; 250/208.1; 250/227.2
(58) Field of Search .......................... 362/31, 551, 560; 385/146, 147, 13; 250/227.2, 208.1, 206, 227.11, 229.28–207.32, 214 R, 235, 239, 216, 578.1; 356/222, 435; 348/294, 332; 358/471, 475, 482, 484; 355/68, 71

(56) References Cited

U.S. PATENT DOCUMENTS 5,182,445 A  * 1/1993  Yamashita ............... 250/208.1
6,259,082 B1 * 7/2001  Fujimoto et al. ........ 250/208.1
6,333,779 B1 * 12/2001 Tabata et al. .................. 355/68
6,469,808 B1 * 10/2002 Onishi et al. ............... 358/475
6,612,730 B1 * 9/2003  Ikeda .......................... 362/558

FOREIGN PATENT DOCUMENTS

JP     8163320     6/1996
JP    10126581     5/1998

* cited by examiner

Primary Examiner—David Porta
Assistant Examiner—Patrick J. Lee
(74) Attorney, Agent, or Firm—Carrier, Blackman & Associates, P.C.; Joseph P. Carrier; William D. Blackman

(57) ABSTRACT

A light guide 3 has a cross-sectional shape substantially ¼ oval. An end of a major axis side of the oval is cut (chamfered) to include a focal point of the oval. Light scattering patterns 3P are provided on a plane 3d formed by cutting. The light guide 3 is housed in a light guide casing 4 to allow the emission plane 3a to be exposed, and a light-emitting source base plate is provided on an end surface of the light guide 3 in the longitudinal direction to form a line-illuminating device 10. This line-illuminating device 10 shows characteristics in which intensity distribution in a sub-scanning direction is not changed much relative to elevation of a document surface. Accordingly, if an optical axis of a rod lens 5 and a light-receiving surface of a line image sensor 6 are arranged in an area with less change of light intensity relative to elevation of the document surface, it is possible to reduce possible deterioration of a reading image even when the document surface is elevated.

10 Claims, 24 Drawing Sheets

BAR-SHAPED LIGHT GUIDE, LINE-ILLUMINATING DEVICE INCORPORATED WITH THE BAR-SHAPED LIGHT GUIDE AND CONTACT-TYPE IMAGE SENSOR INCORPORATED WITH THE LINE-ILLUMINATING DEVICE

BACKGROUND OF THE INVENTION

1. Field of the Invention

The present invention relates to a bar-shaped light guide, a line-illuminating device incorporated with the light guide, and a contact-type image sensor incorporated with the line-illuminating device.

2. Description of the Prior Art

A contact-type image sensor has a smaller number of parts than an image sensor using a reducing optical system. A sensor and a lens array which are optical components can also be arranged closely. Accordingly, there is an advantage that the contact-type image sensor can be made comparatively thin. Thus, the contact-type image sensor is used as equipment for reading a document in a facsimile machine, a copying machine, a hand scanner and the like.

The contact-type image sensor is provided with a line-illuminating device for linearly illuminating a document-reading surface along the main scanning direction. The line-illuminating device using the light guide is known.

FIG. 22 is a cross-sectional view of a contact-type image sensor developed by the present inventor et al. and FIG. 23 is a perspective view of a light guide which is used in that contact-type image sensor.

The contact-type image sensor 101 is provided with a frame 102 in which a line-illuminating device 110 is installed. A lens array 105 is arranged within the frame 102. Mounted on the lower part of the frame 102 is a base plate 107 which is provided with a line image sensor (i.e. a photoelectric conversion element) 106. The line-illuminating device 110 consists of a light guide 103, a light guide casing 104, and a light-emitting source base plate provided with an LED or the like (not shown).

The contact-type image sensor 101 allows illuminating light emitted from an emission plane 103a of the light guide 103 to be incident on a reading surface of a document through a cover glass 108. The document is read by detecting the reflected light using the line image sensor 106 through the lens array 105.

The light guide 103 is made of glass or transparent resin and as shown in FIG. 23, it has a cross-sectional shape substantially ¼ oval in the direction perpendicular to the longitudinal direction. A side surface of the light guide 103 along the longitudinal direction is provided with the emission plane 103a parallel to a minor axis direction of the oval, a plane 103b parallel to the major axis direction of the oval, and a reflecting curved plane 103c. Light scattering patterns 103P are formed on the plane 103b parallel to the major axis direction of the oval by printing white coating materials. The light guide 103 allows the illuminating light incident from end surfaces in the longitudinal direction to be reflected by the inner surface and guides the reflected light in the longitudinal direction. The light guide 103 also allows the light scattered by the light scattering patterns 103P to be reflected by the reflecting curved plane 103c and to emit the reflected light from the emission plane 103a. Now, by changing an area of the light scattering patterns 103P in response to a distance from the end surfaces of the light guide 103, it is intended that the intensity of light emitted from the emission plane 103a be uniform along the longitudinal direction of the light guide 103.

The light guide 103 is, as shown in FIG. 22, housed in the white light guide casing 104 in such a manner that the emission plane 103a is exposed. In this manner, by covering the light guide 103 using the light guide casing 104, the light emitted outside is caused to reflect by the light guide casing 104 and returned to the inside of the light guide 103. Thus, loss of the scattered light is reduced and as a result, intensity of the emission light is improved. The light scattering patterns 103P are formed at a position near a focal point on the plane 103b parallel to the major axis direction of the oval. With this, the light scattered by the light scattering patterns 103P is reflected by the reflecting curved plane 103c and is condensed on the document reading surface. As a result, it is possible to improve the intensity of light on the document-reading surface.

The light emitting source base plate (not shown) provided with a light emitting source consisting of an LED or the like is attached to one end or both ends of the light guide casing 104. In this manner, the line-illuminating device comprises the light guide 103, the light guide casing 104, and the light emitting source base plate.

The conventional light guide and line-illuminating device incorporated with the light guide described above have a first problem described below.

According to the conventional device, it is intended that quantity of illuminating light be maximum in a condition in which the document surface is not elevated. Accordingly, when the document surface is elevated by a fold or spread of the document, the quantity of illuminating light decreases, and an unnatural shade is caused on an image read by the line image sensor 106.

FIG. 24 is a graph showing light intensity characteristics of the contact-type image sensor described above. In FIG. 24, the horizontal axis shows displacement of a sub-scanning direction of which the origin is the focal distance (which is on an upper surface of the cover glass plate 108) of the lens array 105 and the vertical axis shows light intensity measured at each point.

Parameter of each curve means a distance upward from the surface of the glass plate (e.g. the distance 0.0 mm is the surface of the glass plate). Namely, data shown in FIG. 24 is not that measured using a line sensor of the device, but that measured by a separate sensor provided above the glass plate. Accordingly, "light output characteristics when the document surface is elevated by x mm" specifically means "the light output characteristics measured by an optical sensor which is put at a distance of x mm above the upper side surface of the glass plate, corresponding to a state where the document surface is elevated by x mm". However, this is described below as "the light output characteristics when the document surface is elevated by x mm" for clarification.

In FIG. 24, a position in which light intensity is maximum in a condition where the document surface is not elevated (i.e. the position where the illuminating light emitted from the light guide 103 is converged on the document surface) is set as the origin 0 of the displacement in the sub-scanning direction. A side of the light guide 103 from this position is shown by a minus value, while the opposite side is shown by a plus value. A black round mark indicates the light output characteristics when the document surface contacts the cover glass 108 and a square mark indicates the light output characteristics when the document surface is elevated by 0.5 mm from the cover glass 108. A triangular mark indicates the light output characteristics when the document surface is elevated by 1 mm and an x mark indicates the light output characteristics when the document surface is elevated by 1.5 mm. A round mark indicates the light output characteristics when the document surface is elevated by 2.0 mm.

In the contact-type image sensor described above, an optical axis of the lens array 105 is arranged in a position where the displacement in the sub-scanning direction is the origin 0, wherein a light-receiving surface of the line image sensor 106 is arranged on the optical axis. Thus, as shown in FIG. 24, when the document is elevated by 1 mm, the quantity of illuminating light (i.e. quantity of reading light) decreases by 20% or more. Accordingly, unevenness in illumination is produced at a position where bending, crinkles, fold, or spread occur on the document surface and as a result, an embossed-like image has been produced even on a simple white document in an extreme case.

If the reflecting curved plane (i.e. the oval plane) of the light guide is sufficiently increased, the scattering patterns are relatively decreased. Accordingly, an image of the scattering patterns can be formed on the optical axis of a rod lens and an ideal light intensity distribution can be obtained. However, the contact-type image sensor must be larger.

The conventional line-illuminating device also has a second problem described below.

Namely, to improve efficiency of condensing onto an illuminating surface (i.e. a document surface) using the light guide with an oval cross-sectional shape, it is necessary to deepen the oval plane so as to reflect and condense the scattered light more from the focal position. However, in this case, since the cross-sectional area of the light guide increases, there is a trade-off (a problem) in that density of propagation light on the inside of the light guide decreases and intensity of the scattered light generated by the light scattering patterns decreases.

According to the conventional light guide, a single member is provided to fulfill a light guiding and scattering function for guiding the light incident from the end surfaces in the longitudinal direction and generating the scattered light by the light reflecting patterns, and a light condensing function for allowing the scattered light to be reflected by the reflecting curved plane (i.e. the oval plane) to emit it from the emission plane, thereby allowing the emission light to be condensed on the document surface. Accordingly, it is difficult to independently improve the light guide and scattering efficiency and the light condensing efficiency.

Further, to increase the quantity of the emission light, a method for broadening an area of the light scattering patterns has been adopted in the prior art. However, linear dimensions (i.e. dimensions in a main-scanning direction) of the light scattering patterns are limited because uniformity of the light intensity in the main-scanning direction must be secured. This can be considered to increase the width of the light scattering patterns, but the flatter the oval, the more the scattering of light to a point other than a light condensing point is increased. Accordingly, this does not contribute to the increase of light quantity.

Even though the width of the light scattering patterns P is increased, the scattered light from a position where it is displaced a lot from a focal point of the oval is not condensed on an intersection point between the document reading surface and the optical axis of the lens array, but the scattered light diffuses. As a result, the light intensity at the intersection point tends to decrease.

On the other hand, to precisely allow the light to be condensed on the light condensing point (i.e. the document reading surface directly above the optical axis of the lens array), it is desirable that the oval be not as flat (i.e. the oval be close to a circle) and the dimension be larger. The oval which is not so flat is more tolerant to the displacement of the focal position of the scattered light and contributes to the increase of light quantity at the light condensing point to a certain extent even though the width of the light scattering patterns is increased. However, if the oval is closer to the circle, there is another problem in that the scattered light is not totally reflected by the oval curved plane. When the dimension of the light guide is increased, there is also a problem that it takes time to mold and "molding sink" is easily produced.

SUMMARY OF THE INVENTION

The primary object of the present invention is to overcome the above-mentioned problems and to provide an improved light guide in which a reading image deteriorates less even when a document surface is elevated, and an improved line-illuminating device incorporated with such a light guide.

A second object of the present invention is to provide a line-illuminating device which can generate strong scattered light even in narrow light scattering patterns by increasing density of light which is propagated through the light guide and which can allow the scattered light to be efficiently condensed on a document reading surface.

To attain the first object, according to the invention which belongs to a first group, a bar-shaped light guide is provided in which incident illumination from end surfaces is reflected by an inner surface of the light guide and emitted from an emission plane provided along the longitudinal direction, characterized in that a cross-sectional shape of the bar-shaped light guide in a direction perpendicular to the longitudinal direction is substantially ¼ oval of which the end on a major axis side is chamfered, and a side of the bar-shaped light guide along the longitudinal direction comprises the emission plane which is parallel to a minor axis direction of the oval, a plane parallel to the major axis direction of the oval, a light scattering plane provided with light scattering patterns on the plane which is formed by chamfering the end of the major axis side of the ¼ oval, and a reflecting curved plane for reflecting the scattered light from the light scattering patterns toward the emission plane.

The end on the major axis side of the ¼ oval is cut (chamfered) including a focal point of the oval and a plane formed by this cutting is provided with light scattering patterns. Thus, as shown in FIG. 4, characteristics with less change in light intensity can be obtained relative to elevation of a document in a range where displacement in a sub-scanning direction is 1–2 mm. Accordingly, if an optical axis of a rod lens and a light-receiving surface of a line image sensor are arranged in an area in which the light intensity change is less relative to the elevation of the document, it is possible to reduce deterioration of a reading image even when the document surface has been elevated.

A line-illuminating device incorporated with the bar-shaped light guide is provided, in which the bar-shaped light guide is housed in a casing to allow the emission plane to be exposed, and a light-emitting means is provided on at least one end of the bar-shaped light guide. The light scattering patterns are formed in such a manner that a forming area of the light scattering patterns is larger from one end on which the light-emitting means is provided, toward the other end.

A contact-type image sensor, including the line-illuminating device incorporated with the bar-shaped light guide and a lens array for allowing reflected light from the document contained in the illumination from this line-illuminating device to be condensed toward a line image sensor consisting of a photoelectric conversion element, is provided, in which, when the lens array is formed by a plurality of rod lenses, the optical axis of the lens is arranged in an area where the change of light intensity is less relative to the elevation of the document.

With this construction, it is possible to improve decrease of light quantity resulting from the elevation of the document.

According to the invention which belongs to a second group, the line-illuminating device is provided with a light guide section for guiding light from a light source incident from end surfaces in the longitudinal direction, allowing the light to be scattered by light scattering patterns formed along the longitudinal direction, and allowing the light to be emitted from an emission plane formed along the longitudinal direction, and with a light condensing section for allowing the light emitted from the emission plane of the light guide section to be condensed on the reading surface of the document. The light guide section is arranged in contact with the light condensing section or the two are closely arranged.

The line-illuminating device according to the invention which belongs to the second group is constructed to divide the conventional light guide into the light guide section and the light condensing section. Accordingly, it is possible to narrow the cross-sectional area of the light guide section to improve density of light which is propagated through the light guide section, thereby improving intensity of the scattered light. In this case, the light condensing section is only required to have a function for allowing the scattered light emitted from the light guide section to be condensed on the document reading surface. Accordingly, the size and shape of the light condensing section can be designed taking only condensing efficiency into consideration. As a result, it is possible to improve the condensing efficiency.

It is desirable that the light condensing section be provided with a reflecting curved plane (i.e. an oval plane) which is caused to reflect light emitted from the emission plane of the light guide section and allows the reflected light to be condensed on the reading surface of the document. With provision of the reflecting curved plane (i.e. the oval plane), it is possible to allow the scattered light emitted from the light guide section to be efficiently condensed on the document reading surface.

Further, the light guide section and the light condensing section can be covered by the light guide casing except for the emission plane for the document illuminating light. By covering the light guide section and the light condensing section with the light guide casing, it is possible to allow the light emitted outside to be reflected by the light guide casing and to return the reflected light to the light guide section and the light condensing section. With this construction, it is possible to reduce loss of scattered light and improve the intensity of the document illuminating light.

Still further, the light source can be provided on only one side of the light guide section. In this case, the reflecting means can be provided on the other side. If the reflecting means is not provided, the density of the light scattering patterns which are formed along the longitudinal direction of the light guide section can be gradually increased toward the other end of the light guide section.

BRIEF DESCRIPTION OF THE DRAWINGS

The above and other objects, features and advantages of the present invention will become more apparent from the following description when taken in conjunction with the accompanying drawings.

DETAILED DESCRIPTION OF THE PREFERRED EMBODIMENTS (An Embodiment Belonging to a First Group)

Figure 1:
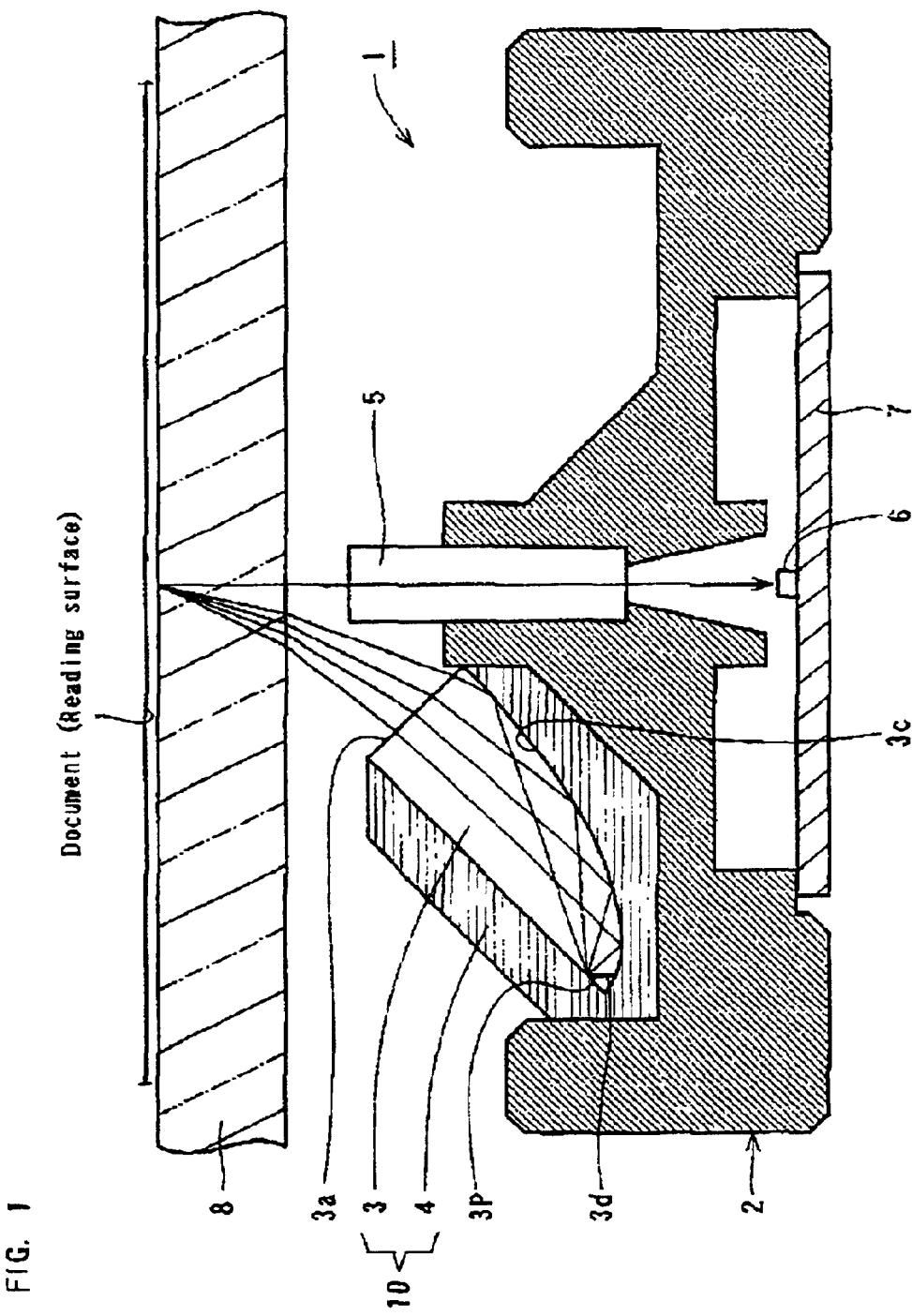
FIG. 1 is a cross-sectional view of a contact-type image sensor which is provided with a light guide according to the present invention and a line-illuminating device incorporated with the light guide.

A contact-type image sensor shown in FIG. 1 is provided with a frame 2 in which a line-illuminating device 10 is incorporated. A lens array 5 is arranged within the frame 2. Attached to a lower section of the frame 2 is a base plate 7 on which a line image sensor (i.e. a photoelectric conversion element) 6 is mounted. The line-illuminating device 10 consists of a light guide 3, a light guide casing 4, and a light-emitting source base plate (not shown) provided with an LED or the like. Reference numeral 8 is a cover glass.

Figure 2:
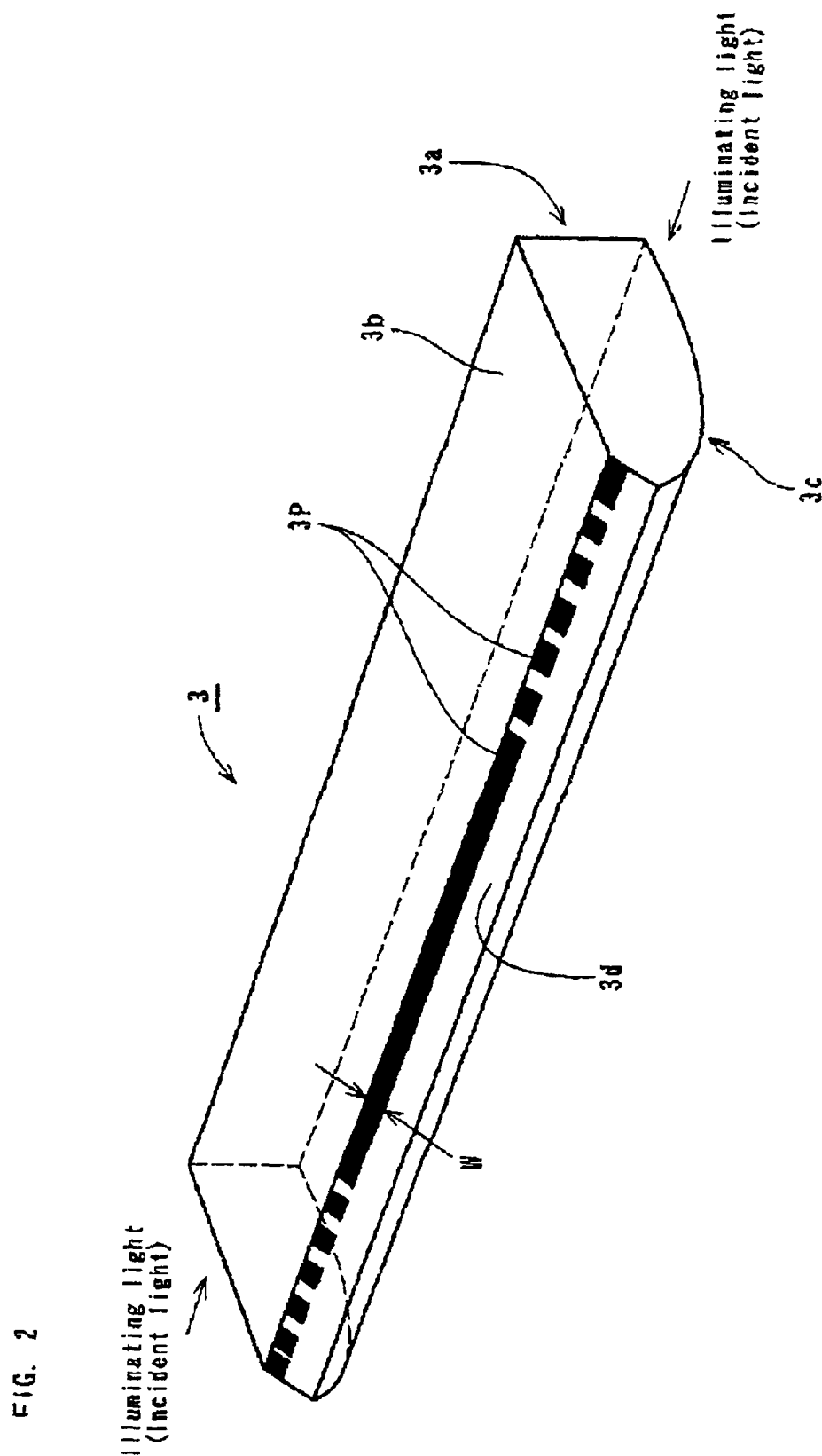
FIG. 2 is a perspective view of the light guide according to the present invention.

The light guide 3 is made of glass or transparent resin. The light guide 3 has, as shown in FIG. 2, a cross-sectional shape substantially ¼ oval in the direction perpendicular to the longitudinal direction, and an end on the major axis side of the oval is chamfered. This chamfered plane includes a focal point of the oval. The chamfered plane is formed with light scattering patterns 3P. Accordingly, a side plane along the longitudinal direction of the light guide 3 comprises an emission plane 3a parallel to the minor axis direction of the oval, a plane 3b parallel to the major axis direction of the oval, the plane (a light scattering plane 3d) formed by chamfering the end of the major axis side of the ¼ oval on which the light scattering patterns 3P are provided, and a reflecting curved plane 3c for reflecting the scattered light from the light scattering patterns 3P toward the emission plane. The light scattering patterns 3P are formed by printing white coating materials. Reference letter W shows width of the light scattering patterns 3P.

Dimension examples of the light guide 3 are as follows. The major axis of the oval is 10.6 mm long and the minor axis is 3.5 mm long. In this case, since the focal point is situated 0.6 mm inside from the oval end of the major axis, C chamfering of 0.6 is made. The angle of chamfering is 45 degrees, but it may be 90 degrees. Two dimensions of 0.3 mm and 0.6 mm are provided here for the width W of the light scattering patterns 3P. The light guide 3 is, as shown in FIG. 1, housed in the light guide casing 4. The light guide 3 is attached to the frame 2 in such a manner that the plane 3b which is parallel to the longitudinal axis of the light guide 3 is inclined at 45 degrees to a document reading surface. When the light guide 3 is inclined at 45 degrees, light from the emission plane 3a is emitted in a direction of about 60 degrees (An optical axis of the illuminating light is about 60 degrees).

Figure 3:
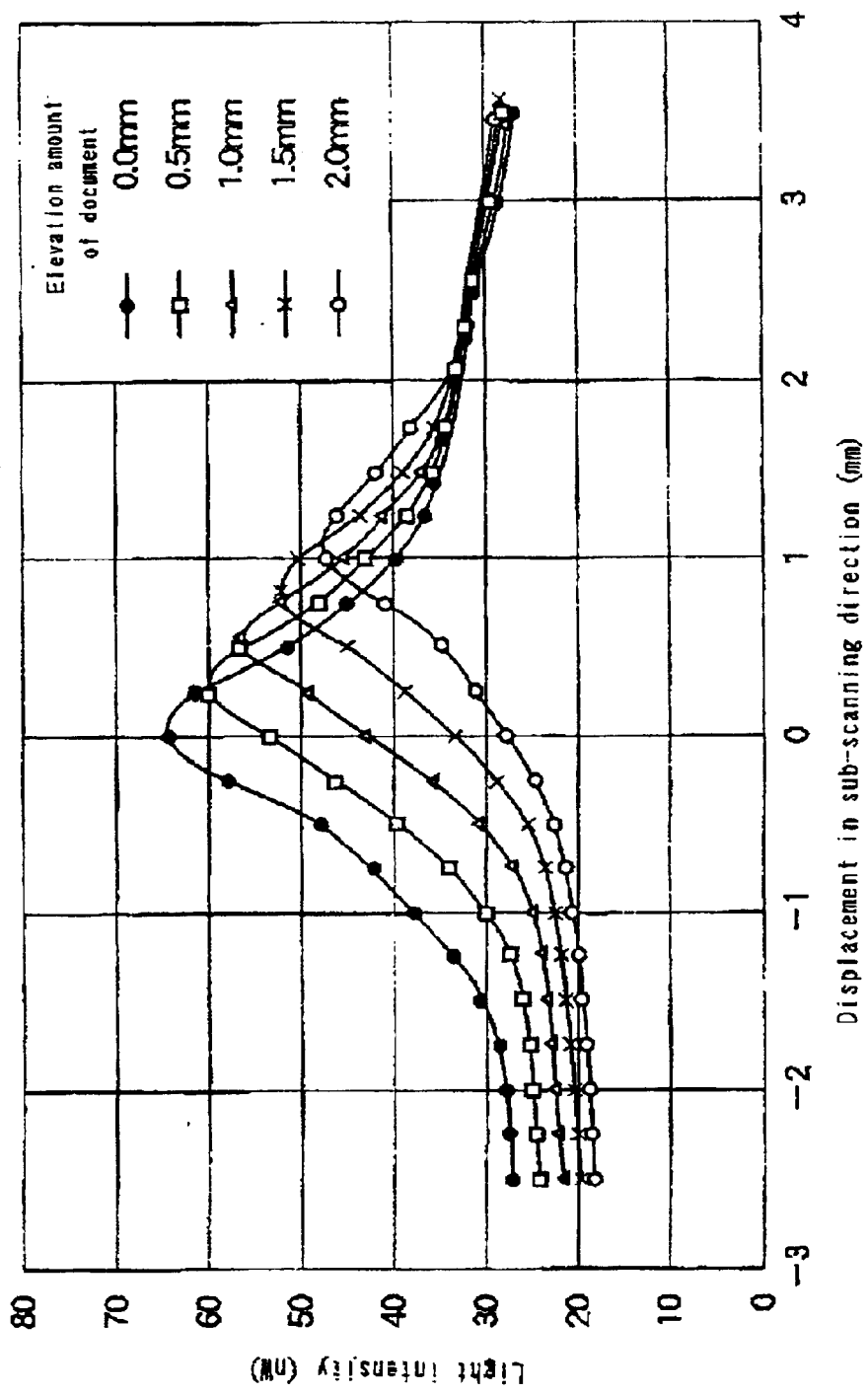
FIG. 3 is a graph showing light intensity characteristics of the line-illuminating device incorporated with a light guide of which the width of light scattering patterns is 0.3 mm.
Figure 4:
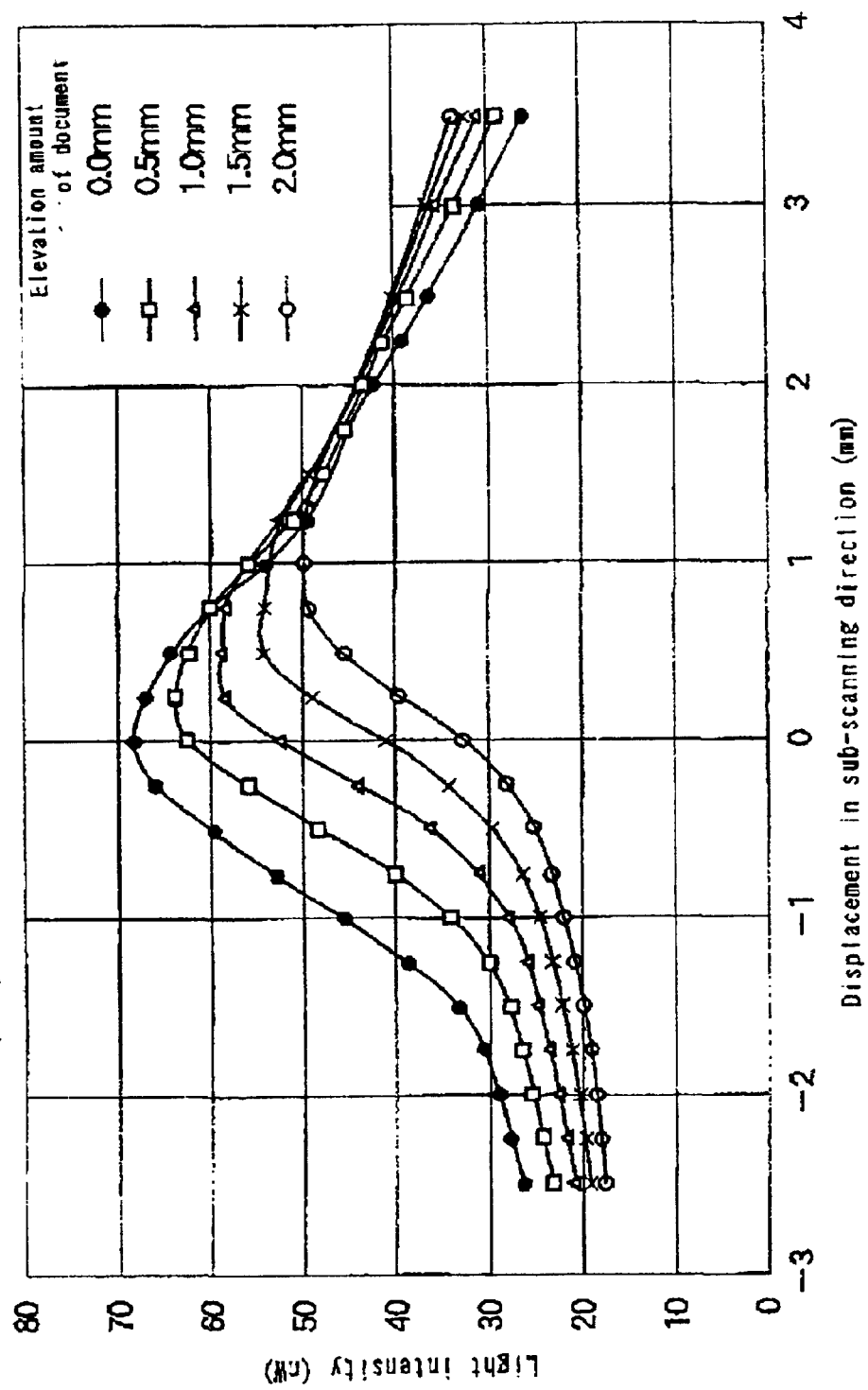
FIG. 4 is a graph showing light intensity characteristics of the line-illuminating device incorporated with a light guide in which the width of light scattering patterns is 0.6 mm.

FIG. 3 is a graph showing light intensity characteristics of the line-illuminating device incorporated with the light guide in which the width of the scattering patterns is 0.3 mm. FIG. 4 is a graph showing light intensity characteristics of the line-illuminating device incorporated with the light guide in which the width of the scattering patterns is 0.6 mm.

Movement of a peak of the light intensity characteristics relative to elevation of a document paper mainly depends on the inclination of an optical axis of the illuminating light. In the right side characteristics of each peak of the light intensity characteristic curves, the half-value width depends on the width W of the scattering patterns 3P formed on the chamfered plane. Accordingly, as shown in FIGS. 3 and 4, it is possible to allow the characteristic curves to substantially agree by the inclination of the light guide 3 and the width W of the scattering patterns 3P.

Referring to FIG. 4 (in which the width of the scattering patterns is 0.6 mm), if an optical axis of the lens array 5 is set at around 0.75 mm of the X coordinate (i.e. the sub-scanning direction), the change of light quantity is less than 3% relative to elevation of the document in 0–1.0 mm. Further, when the optical axis of the lens array 5 is set between 1.25 mm and 2.25 mm of the X coordinate (i.e. the sub-scanning direction), the degree of brightness decreases more than 20% compared with when the optical axis is set at 0.75 mm. However, a change of light quantity of less than 3% can be secured in a range where the elevation of the document is 0–2.0 mm.

Figure 5:
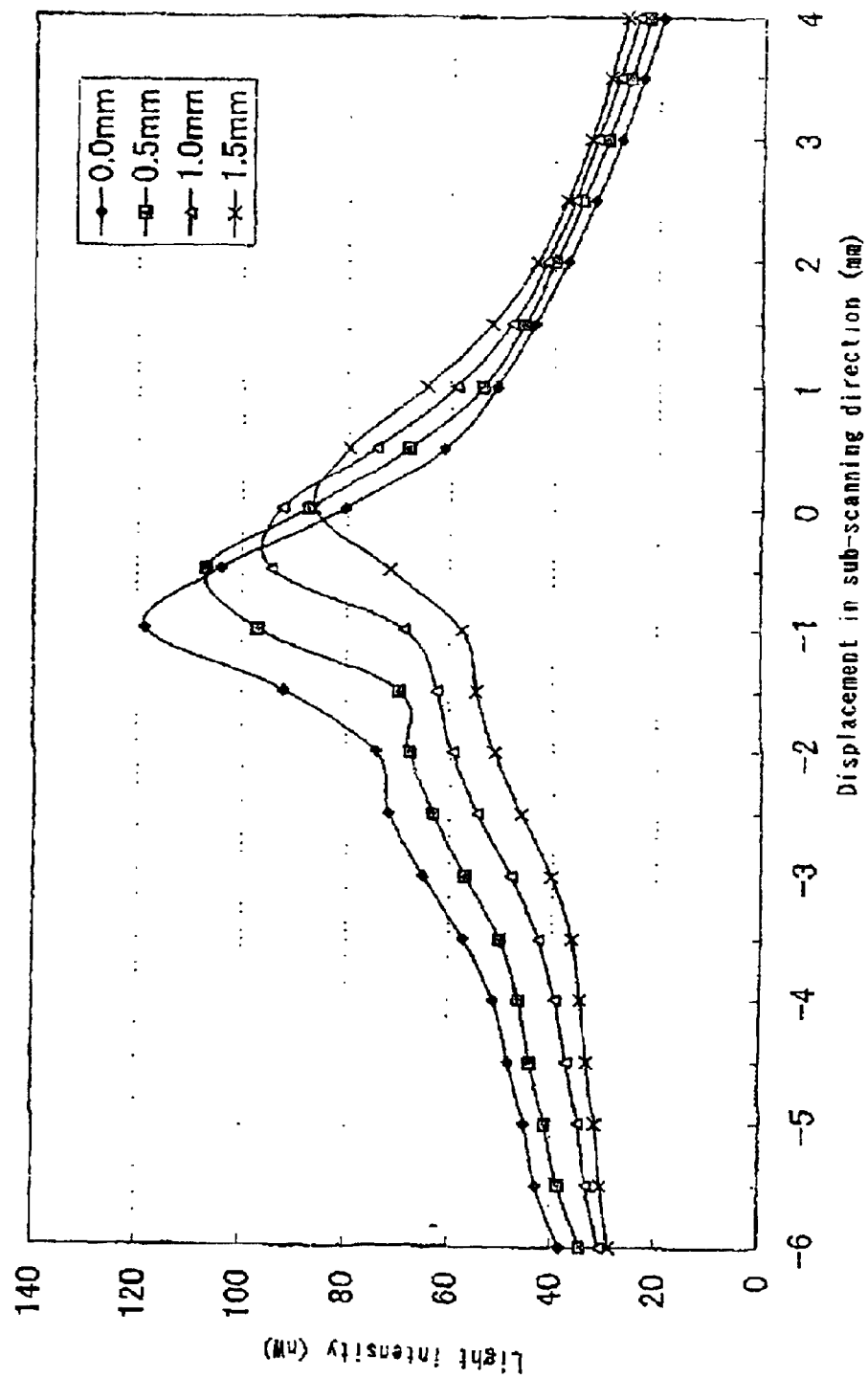
FIG. 5 is a graph showing light intensity characteristics before correction is made for decrease in light quantity of a light guide which is provided with light scattering patterns on a C plane where C chamfering of 0.5 is made.
Figure 6:
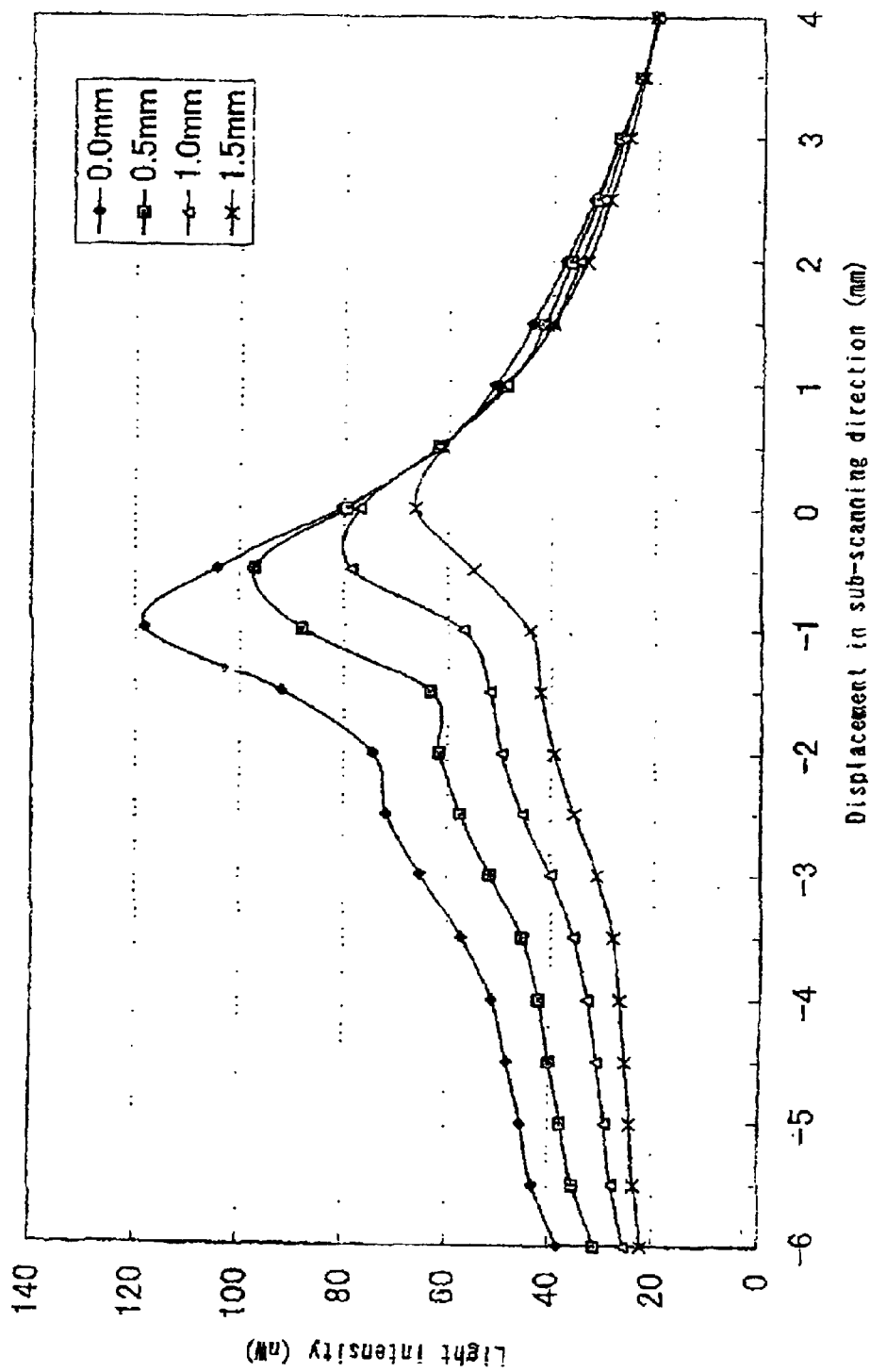
FIG. 6 is a graph showing light intensity characteristics after correction is made for decrease in light quantity of a light guide which is provided with light scattering patterns on a C plane where C chamfering of 0.5 is made.

FIG. 5 is a graph showing light intensity characteristics before correction for decrease in light quantity of the light guide in which light scattering patterns are formed on the C plane where C chamfering of 0.5 is made. FIG. 6 is a graph showing light intensity characteristics after correction for decrease in the light quantity.

Figure 7:
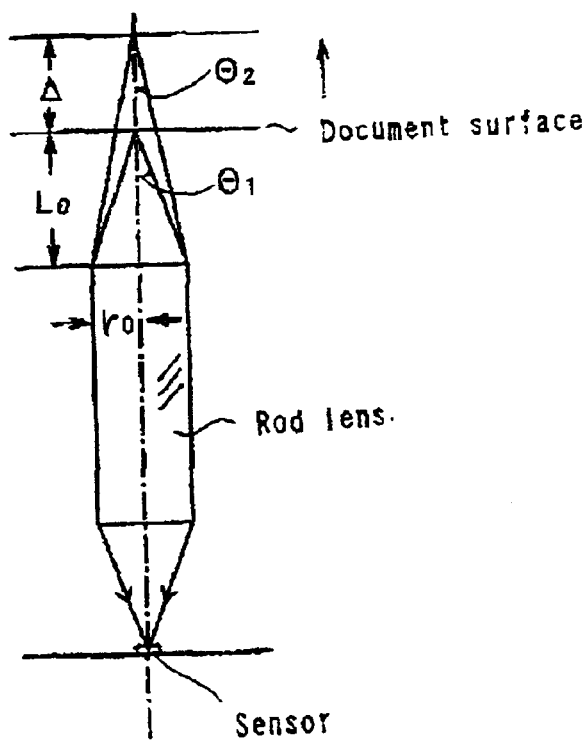
FIG. 7 is a view explaining a decrease in quantity of light incident on a rod lens.

As described above, data for the light intensity is not measured by a line sensor through the rod lens array of the device, but measured by a separate sensor which is arranged above the glass plate. On the other hand, quantity of light actually entering the line sensor through the rod lens decreases. As shown in FIG. 7, when the rod lens takes in the reflected light at a location (which corresponds to the elevation of the document) away from a normal focal distance L0 (without elevation of the document) by, an intake angle is narrowed from θ1 to θ2. As a result, the quantity of light incident on the sensor is less than the light intensity measured above the glass plate.

A ratio of the intake angle θ2/θ1 to each curve corresponding to a distance from the glass plate in FIG. 5 is expressed as follows:

$$\theta 2/\theta 1 = \tan\{r0/(L0+.)\} \tan(r0/L0)$$

where L0=4.8 mm and r0 (i.e. effective radius of the lens)=0.25 mm. Light intensity characteristics after correction is made in accordance with the characteristics of FIG. 5 are shown in FIG. 6.

It is obvious from FIG. 6 that if the optical axis of the rod lens is set at the position at which each curve overlaps, the change of light quantity due to the elevation of the document can be most prevented.

When an optical system such as a reducing optical system constructed using a lens other than the rod lens is used, the correction described above cannot be made. In this case, it is advisable to select the position at which each curve is comparatively well overlapped in FIG. 5 as the optical axis.

Figure 8:
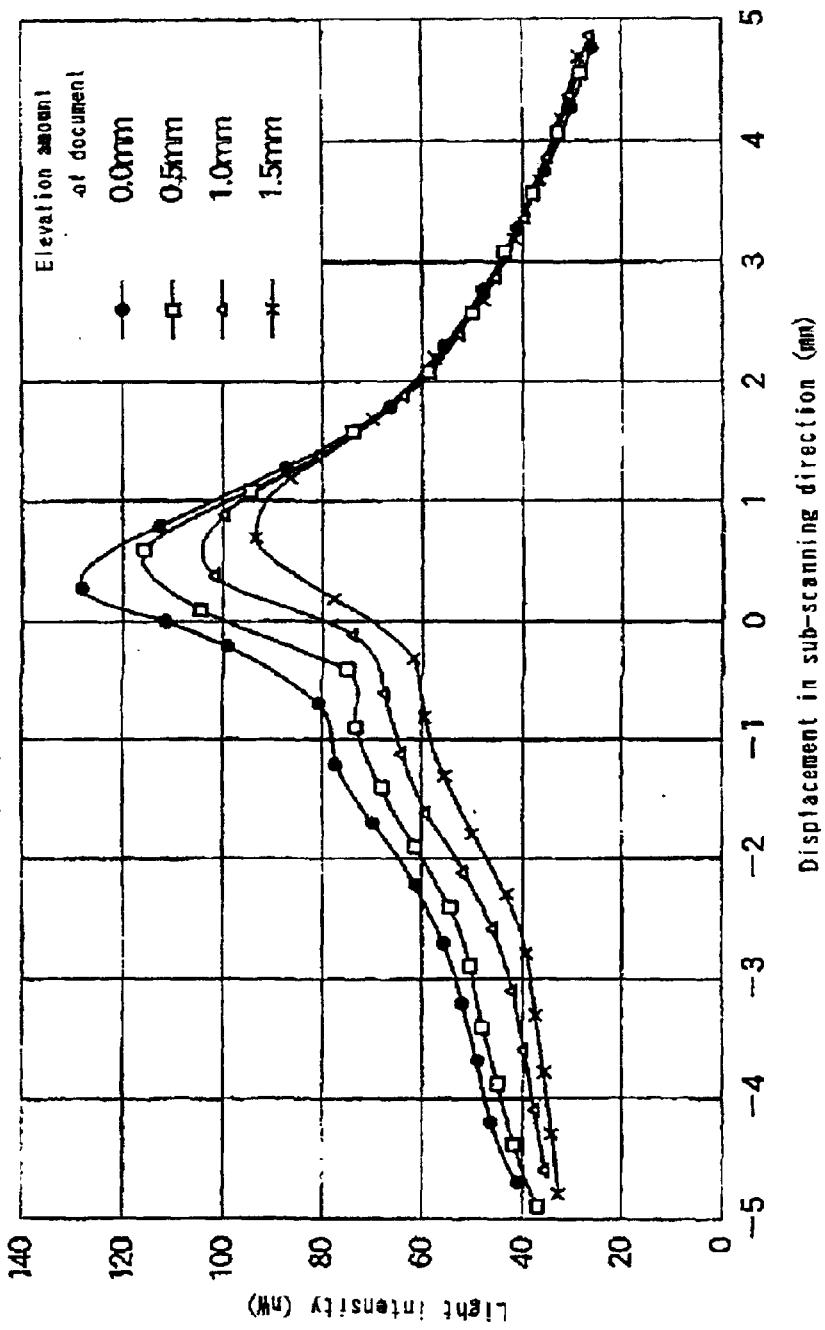
FIG. 8 is a graph showing light intensity characteristics when a light guide in which the width of light scattering patterns is 0.3 mm is installed with an inclination of 55 degrees.

FIG. 8 is a graph showing light intensity characteristics when the light guide with 0.3 mm-wide scattering patterns is installed with an inclination of 55 degrees. When the inclination of the light guide 3 is set at 55 degrees, even though the width of the scattering patterns is 0.3 mm, a change of light quantity relative to the elevation of the document between 0 to 1.5 mm is within several percent in a range of 1.5–5.0 mm on the X coordinate.

(Another Embodiment of the First Group)

Figure 9:
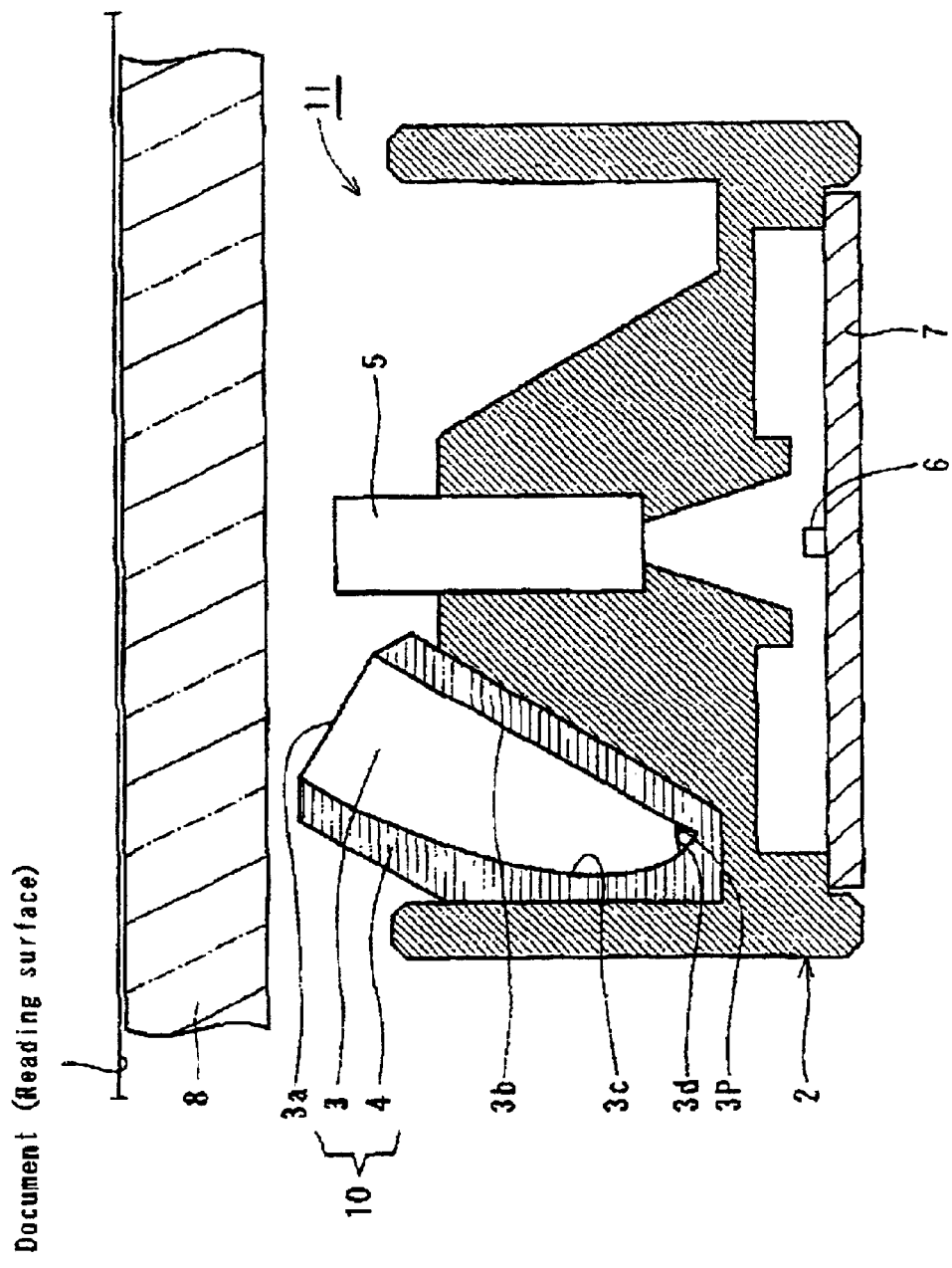
FIG. 9 is a cross-sectional view of another contact-type image sensor which is provided with a light guide according to the present invention and a line-illuminating device incorporated with the light guide.

FIG. 9 is a cross-sectional view of another contact-type image sensor provided with a light guide according to the present invention and a line-illuminating device in which the light guide is incorporated. The light guide 3 can be installed in such a manner that the reflecting curved plane 3c is situated outside. In this arrangement, the cross-sectional structure of the contact-type image sensor 11 is tall, but the width of the contact-type image sensor 11 can be narrowed.

FIGS. 1 and 9 show the contact-type image sensors 1 and 11 provided with one set of line-illuminating devices, but two sets of line-illuminating devices can be used by symmetrically arranging a line-illuminating device 10 on each side of the lens array 5. With this arrangement, it is possible to increase the quantity of illuminating light.

(A Comparative Example of the First Group)

Figure 10:
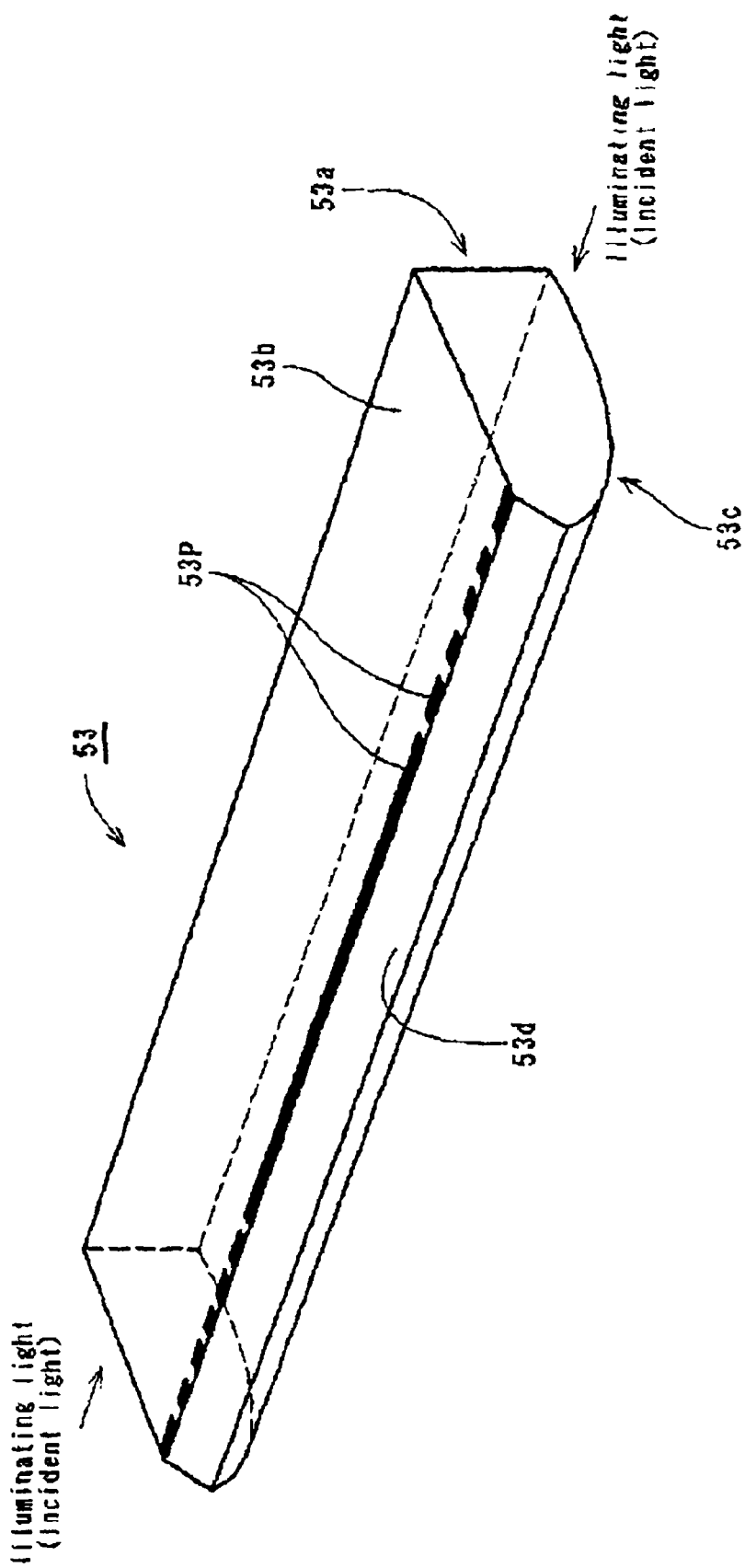
FIG. 10 is a perspective view of a conventional light guide of which the edge section is chamfered for comparison.
Figure 11:
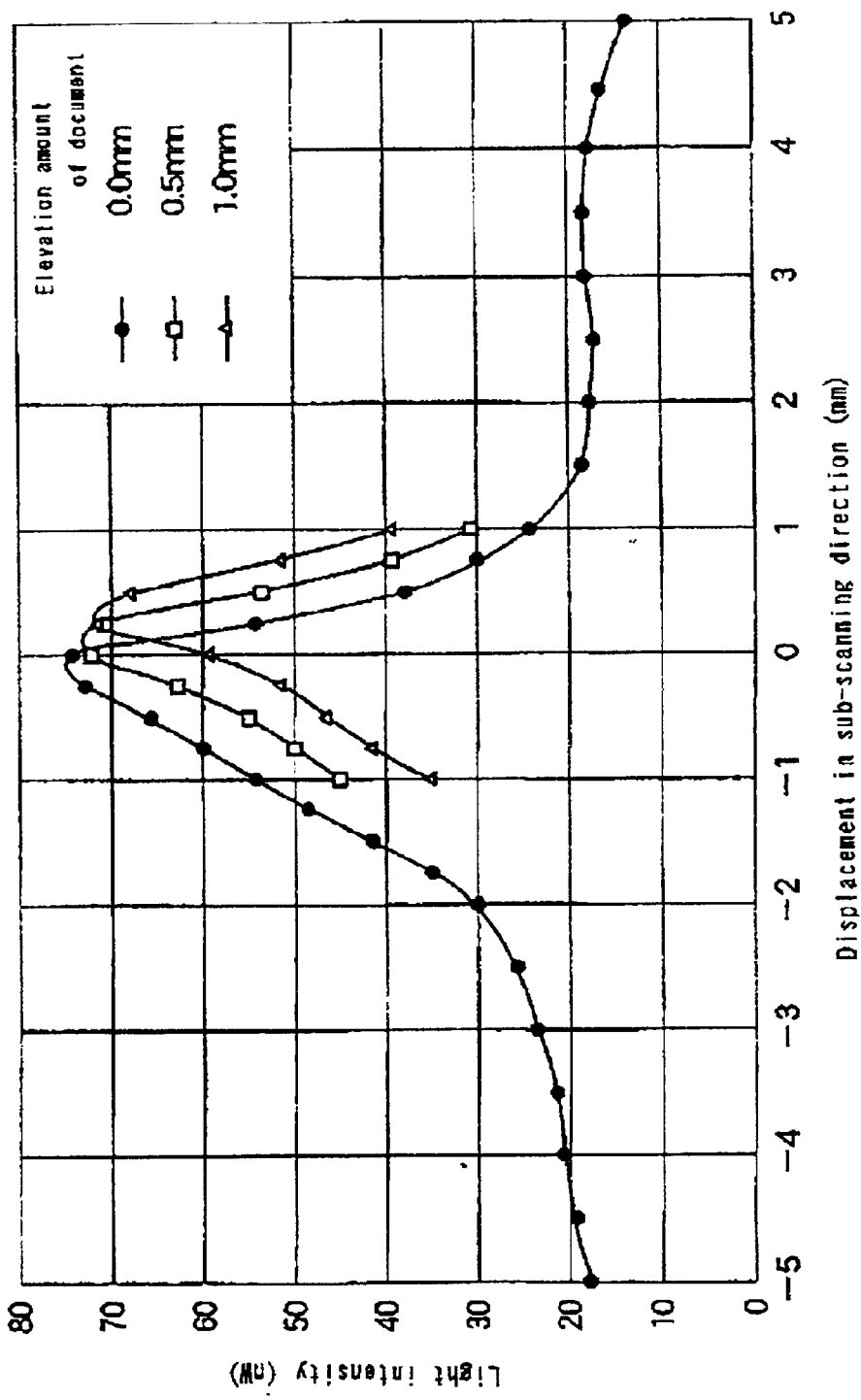
FIG. 11 is a graph showing light intensity characteristics of a line-illuminating device incorporated with the conventional light guide shown in FIG. 10 for comparison.

FIG. 10 is a perspective view of a light guide according to a comparative example in which an edge section of the light guide is chamfered. FIG. 11 is a graph showing light intensity characteristics of a line-illuminating device in which the light guide according to the comparative example shown in FIG. 10 is incorporated.

Figure 23:
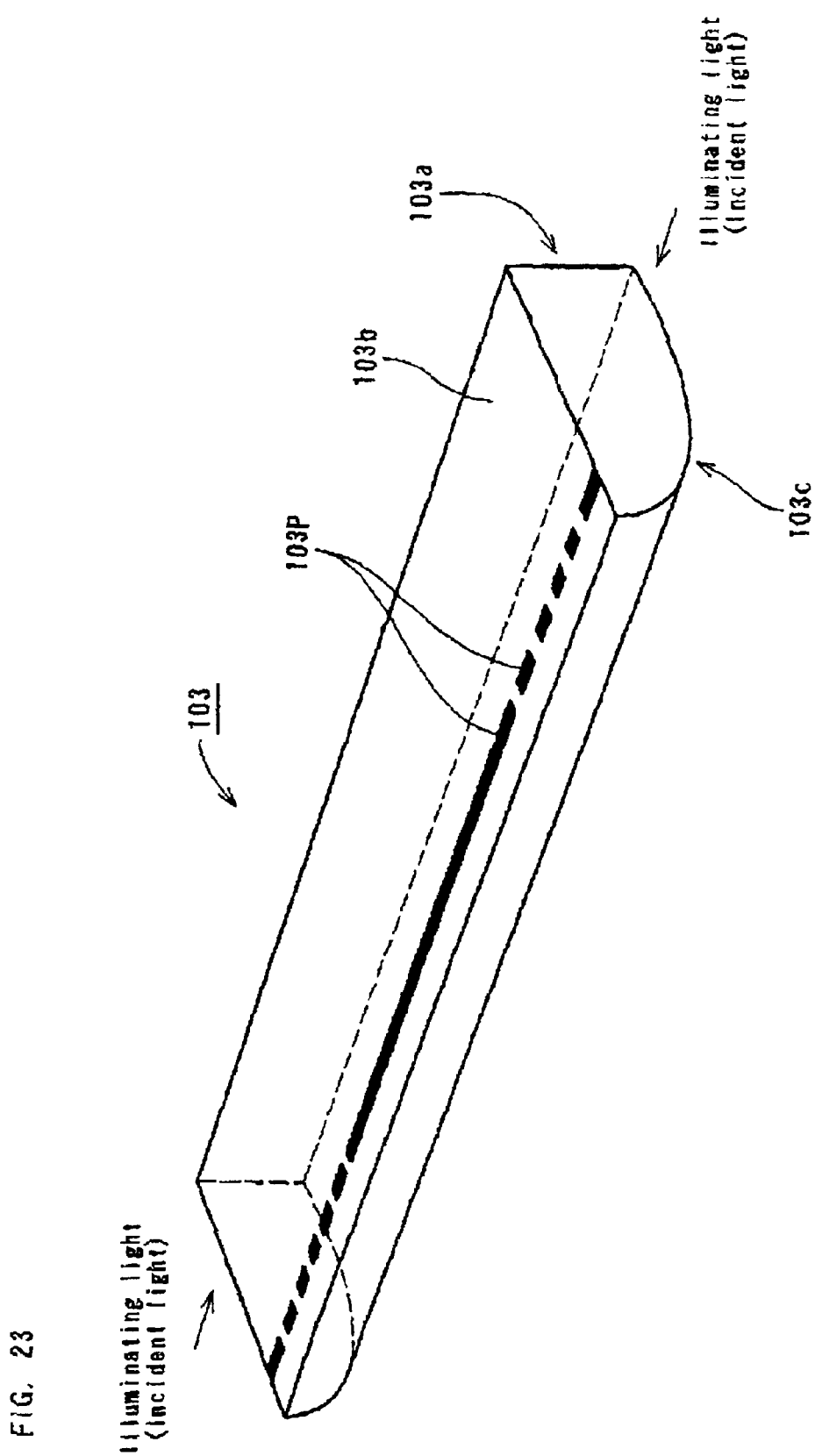
FIG. 23 is a perspective view of a light guide which is used in the contact-type image sensor of FIG. 22.
Figure 24:
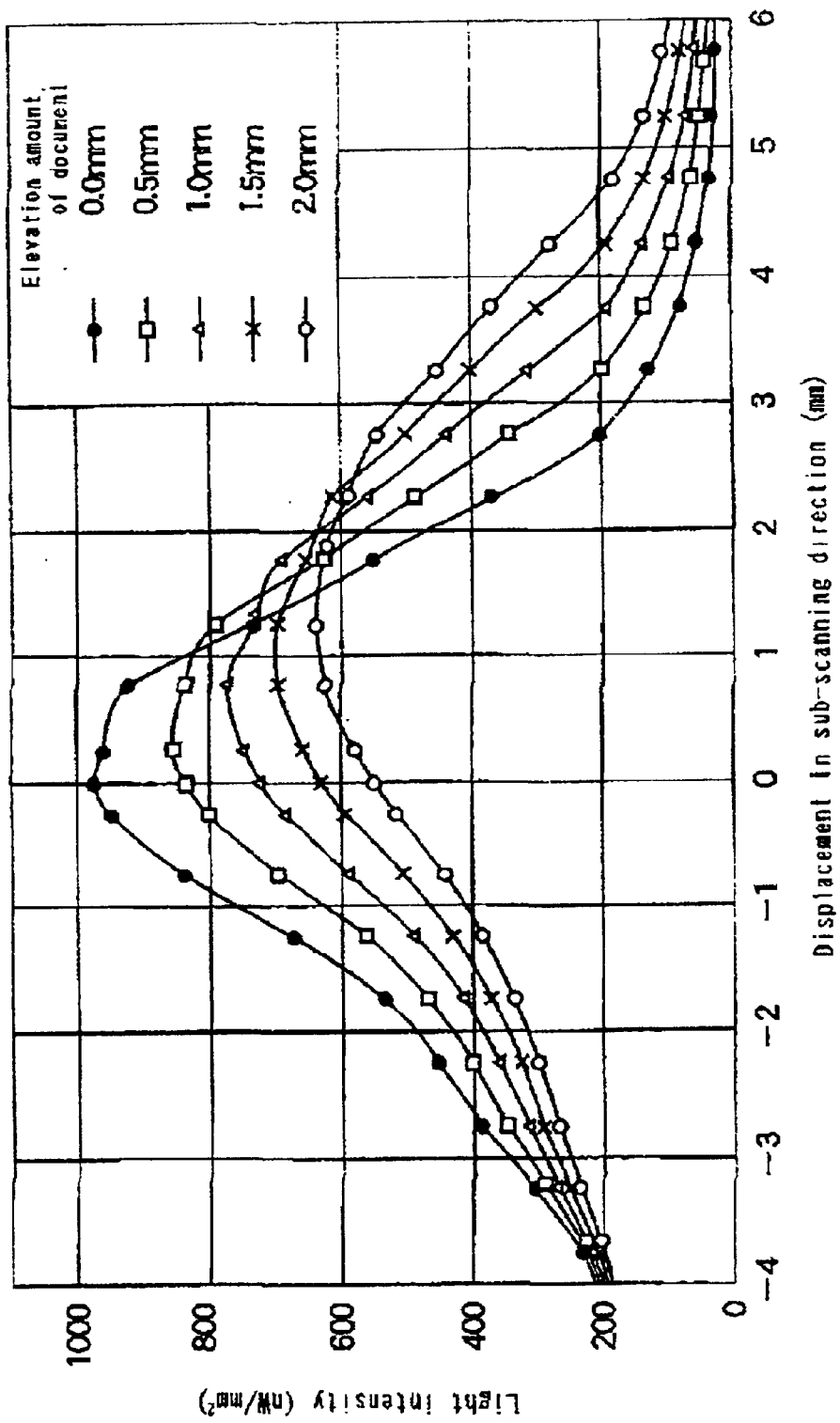
FIG. 24 is a graph showing light intensity characteristics of the contact-type image sensor of FIG. 22.

As shown in FIG. 10, the light guide 53 according to the comparative example is provided, in which an end of the major axis side of the ¼ oval in the light guide 103 shown in FIG. 23 is chamfered. Accordingly, this light guide 53 is provided with light scattering patterns 53P on a plane parallel to the major axis of the oval. Reference numeral 53a is an emission plane, reference numeral 53b is a plane (light scattering plane) parallel to a major axis of an oval on which light scattering patterns 53P are formed, and a numeral 53c is a reflecting curved plane. Reference numeral 53d is a chamfered plane. Light intensity characteristics of the line-illuminating device using this light guide 53 are, as shown in FIG. 11, sharp peak characteristics. Accordingly, if an optical axis of the lens array 5 is displaced on the plus side of the X coordinate (i.e. the sub-scanning direction), the intensity of document reading light decreases considerably.

On the contrary, as shown in FIG. 2, by forming the light scattering patterns 3P on the chamfered plane 3d, it is possible to gradually lower the light intensity on the side away from the light guide 3 (plus side of displacement in the sub-scanning direction) (i.e. it is possible to let the peak characteristics be broad characteristics) as shown in FIGS. 3 through 8. As a result, it is possible to realize characteristics providing less change of light intensity relative to the elevation of the document.

As described above, according to the invention which belongs to the first group, the light guide with an oval cross-sectional shape is provided. When the end of the major axis side of the oval is cut (chamfered) to include a focal point of the oval and the light scattering patterns are formed on the cut plane, it is possible to provide intensity distribution in the sub-scanning direction as characteristics with less change relative to the elevation of the document surface. Accordingly, by arranging the optical axis of the rod lens and the light-receiving surface of the line image sensor in an area where the light intensity does not change as much relative to the elevation of the document, it is possible to reduce deterioration of the reading image even when the document surface is elevated.

(Embodiments Belonging to a Second Group)

Figure 12:
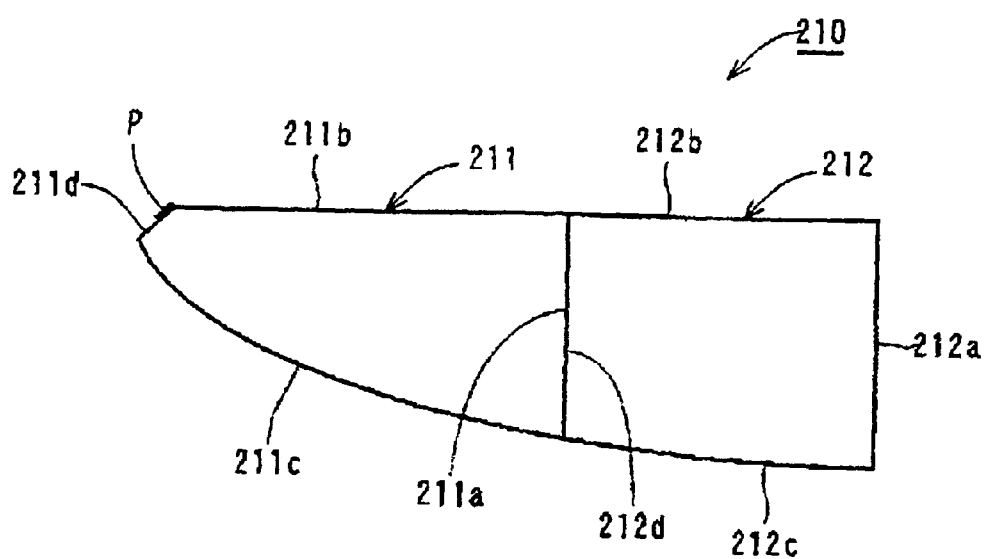
FIG. 12 is a cross-sectional view showing a first embodiment of a line-illuminating device according to a second invention group of the present application.
Figure 13:
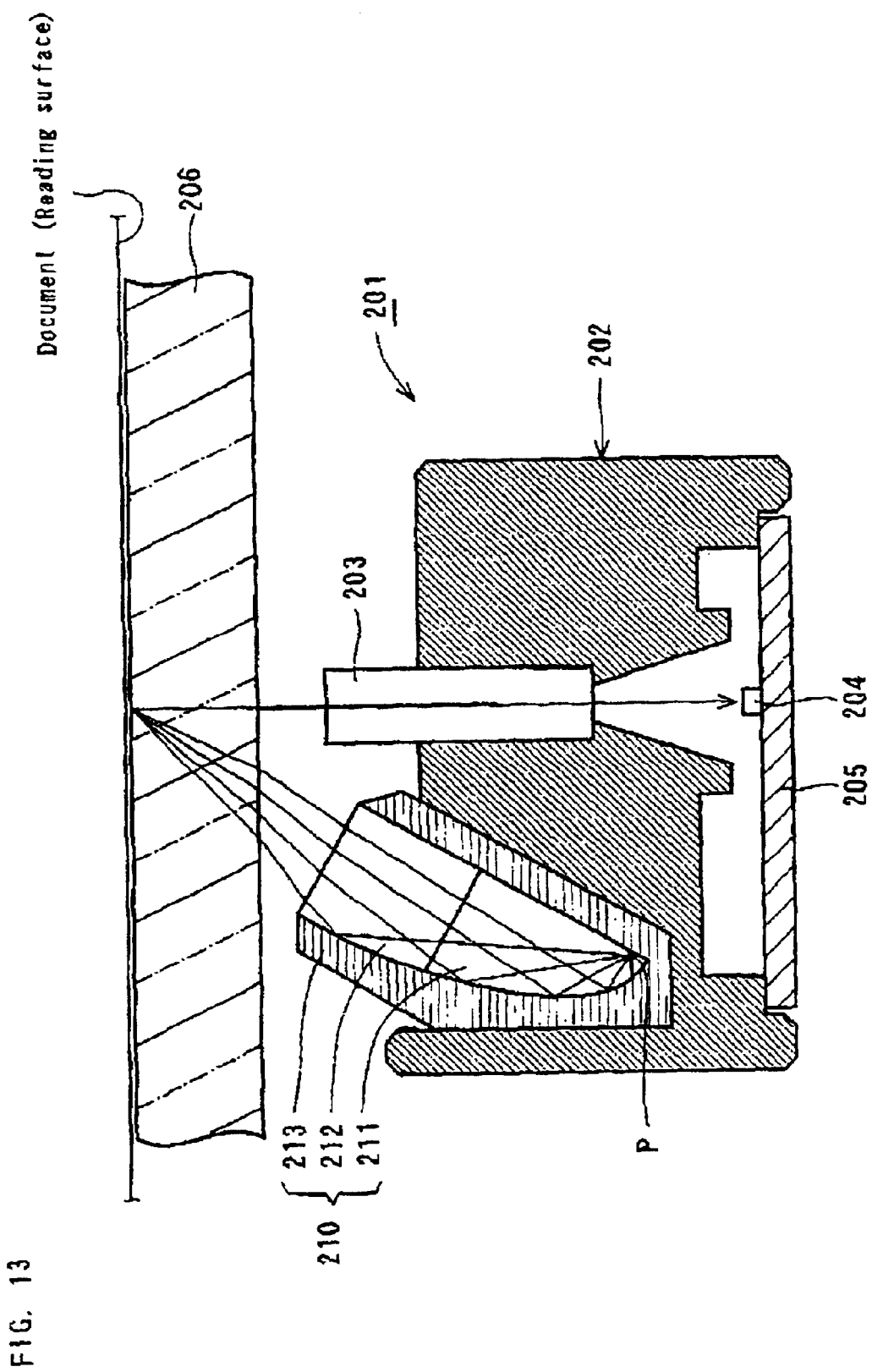
FIG. 13 is a cross-sectional view of a contact-type image sensor provided with the line-illuminating device shown in FIG. 12.
Figure 14:
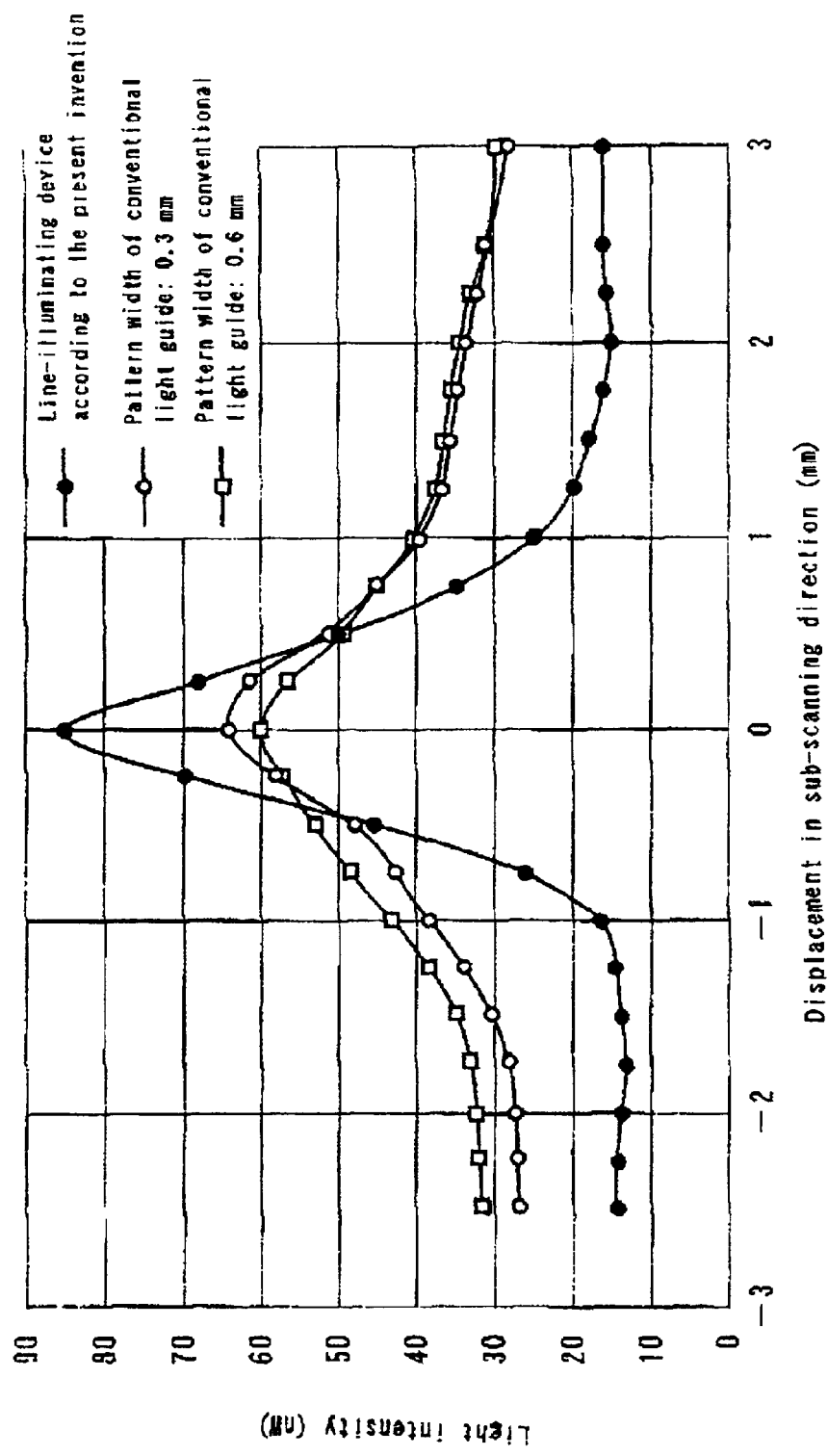
FIG. 14 is a graph showing the light intensity characteristics of the line-illuminating device shown in FIG. 12 and light intensity characteristics of the conventional line-illuminating device.

FIG. 12 is a cross-sectional view showing a first embodiment of a line-illuminating device according to the invention which belongs to a second group and FIG. 13 is a cross-sectional view of a contact-type image sensor provided with the line-illuminating device shown in FIG. 12. FIG. 14 is a graph showing light intensity characteristics of document illumination in the contact-type image sensor shown in FIG. 13.

As shown in FIG. 12, in the line-illuminating device 210 according to the invention which belongs to the second group, a conventional light guide is divided into two sections (i.e. a light guide section 211 and a light condensing section 212) right and left to be substantially parallel to a minor axis of the oval. The divided light guide section 211 and the light condensing section are caused to contact one another. A ratio of the cross-sectional area of the light guide section 211 and the light condensing section 212 is about 1:1. A light-emitting source base plate (not shown) provided with a light-emitting source such as an LED is provided on an end surface of the light guide section 211 in the longitudinal direction. Reference numeral 211a is an emission plane for scattered light of the light guide section 211 and reference numeral 211b is a plane parallel to a major axis of an oval of the light guide section 211. Numeral 211c is a reflecting curved plane (an oval plane) of the light guide section 211. Reference numeral 211d is a chamfered plane and a mark P is light scattering patterns. Reference numeral 212a is an emission plane of the light condensing section 212 and numeral 212b is a plane parallel to a major axis of the oval of the light condensing section 212. Numeral 212c is a reflecting curved plane (i.e. an oval plane) of the light condensing section 212 and 212d is an incident plane of the scattered light.

As shown in FIG. 13, in the line-illuminating device 210 according to the invention which belongs to the second group, the light guide section 211 and the light condensing section 212 shown in FIG. 12 come into contact and are housed in a light guide casing 213. Light from a light-emitting source (not shown) which is provided on end surfaces of the light guide section 211 in the longitudinal direction is caused to enter the inside of the light guide section 211 from the end surfaces of the light guide section 211. The incident light is propagated in the longitudinal direction (i.e. in the direction perpendicular to the paper surface of FIG. 12) of the light guide section 211, being totally reflected at each inner surface (211a–211d) of the light guide section 211. Then, the light to be propagated is scattered by light scattering patterns P formed on the chamfered plane 211d. Since the light guide section 211 and the light condensing section 212 do not optically come into contact at a boundary surface, the scattered light mainly from the light scattering patterns P of the light guide section 211 are caused to enter the light condensing section 212. The scattered light is reflected by the reflecting curved plane (i.e. the oval plane) and then condensed on the document surface.

In FIG. 13, reference numeral 201 is a contact-type image sensor provided with the line-illuminating device according to the present invention, numeral 202 is a frame, and 203 is a lens array. 204 is a line image sensor, 205 is a sensor base plate, and 206 is a cover glass.

Further, in FIG. 13, the line-illuminating device 210 is arranged so that the reflecting curved plane is situated on the left side of the figure, but the line-illuminating device 210 can be arranged so that the reflecting curved plane is situated on a side close to the lens array 203.

Light intensity distribution in the sub-scanning direction of the document surface of the contact-type image sensor 201 provided with the line-illuminating device 210 according to the invention which belongs to the second group shown in FIG. 13 became the characteristics shown by round black marks in FIG. 14. By dividing the conventional light guide into two sections of the light guide section 211 and the light condensing section 212, density of propagation light within the light guide section 211 approximately doubled and intensity of the scattered light was increased. As a result, the peak of the light intensity on the document surface has been increased. At the same time, the light intensity at a position displaced from the light condensing point became small. Thus, it is clear that light-condensing efficiency has been improved.

Figure 15:
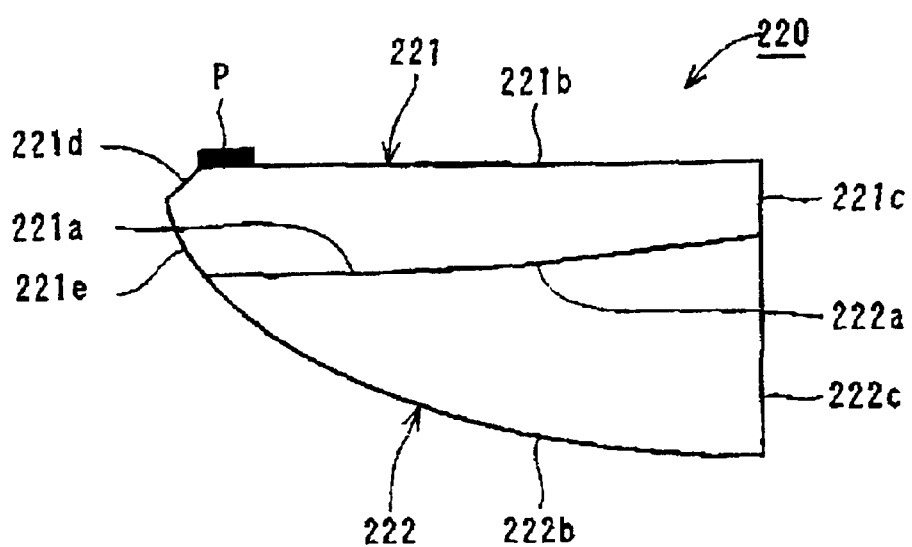
FIG. 15 is a cross-sectional view showing a second embodiment of a line-illuminating device according to the second invention group of the present application.
Figure 16:
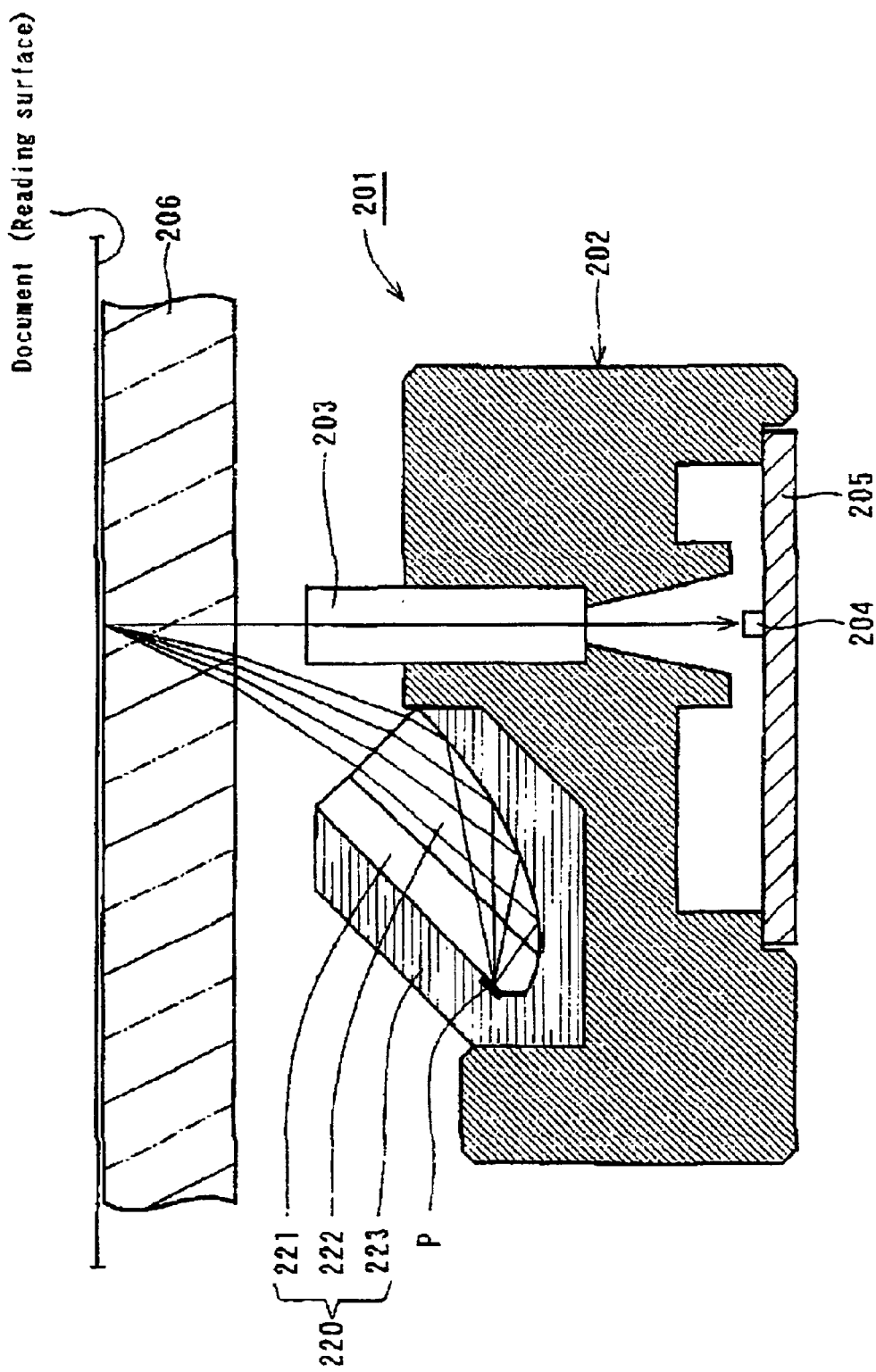
FIG. 16 is a cross-sectional view of a contact-type image sensor provided with the line-illuminating device shown in FIG. 15.

FIG. 15 is a cross-sectional view showing a second embodiment of the line-illuminating device according to the invention which belongs to the second group and FIG. 16 is a cross-sectional view of a contact-type image sensor provided with the line-illuminating device shown in FIG. 15. The line-illuminating device 220 shown in FIG. 15 is formed by vertically dividing the conventional light guide into two sections (i.e. the light guide section 221 and the light condensing section 222) substantially parallel to the major axis of the oval. The divided light guide section 221 and light condensing section 222 are arranged to come into contact. Provided on an end surface of the light guide section 221 in the longitudinal direction is a light-emitting source base plate (not shown) which is provided with a light-emitting source such as an LED. Light scattering patterns P are provided near a focal position of the oval on a plane 221b parallel to the major axis of the oval.

Reference numeral 221a is an emission plane of scattered light of the light guide section 221 and numeral 221b is a plane parallel to the major axis of the oval. 221c is a plane parallel to the minor axis of the oval and 221d is a chamfered plane. 221e is an oval curved plane of the light guide section 221. 222a is an incident plane of the light condensing section 222 and 222b is a reflecting curved plane (i.e. an oval plane). 222c is an emission plane of the document illuminating light.

The line-illuminating device 220 shown in FIG. 15 is designed to have a large curvature [by making the reflecting curved plane (i.e. the oval surface) in a shape close to a circle] of a reflecting curved plane (i.e. an oval plane) so that the light condensing efficiency can improve. The line-illuminating device 220 is formed by vertically dividing the entire cross-sectional shape into two sections of a light guide section 221 and a light condensing section 222. With this construction, it is possible to make the cross-sectional shape of each section of 221 and 222 thin and make their forming easier.

As shown in FIG. 16, the line-illuminating device 220 comprises a light guide section 221, a light condensing section 222, and a light guide casing 223. The light guide section 221 and the light condensing section 222 come into contact and are housed in the light guide casing 223. Light from a light-emitting source (not shown) provided on end surfaces of the light guide section 221 in the longitudinal direction is caused to enter the light guide section 221 from the end surfaces of the light guide section 221. The incident light is totally reflected at each inner surface of the light guide section 221 and propagated in the longitudinal direction (i.e. in the direction perpendicular to the paper surface) of the light guide section 221. Then, the light to be propagated is scattered by light scattering patterns P. The light guide section 221 and the light condensing section 222 do not optically contact each other at a boundary surface. Accordingly, the scattered light mainly from the light scattering patterns P of the light guide section 221 is caused to enter the light condensing section 222 and is reflected by the reflecting curved plane (the oval plane) to be condensed on the document surface.

Figure 17:
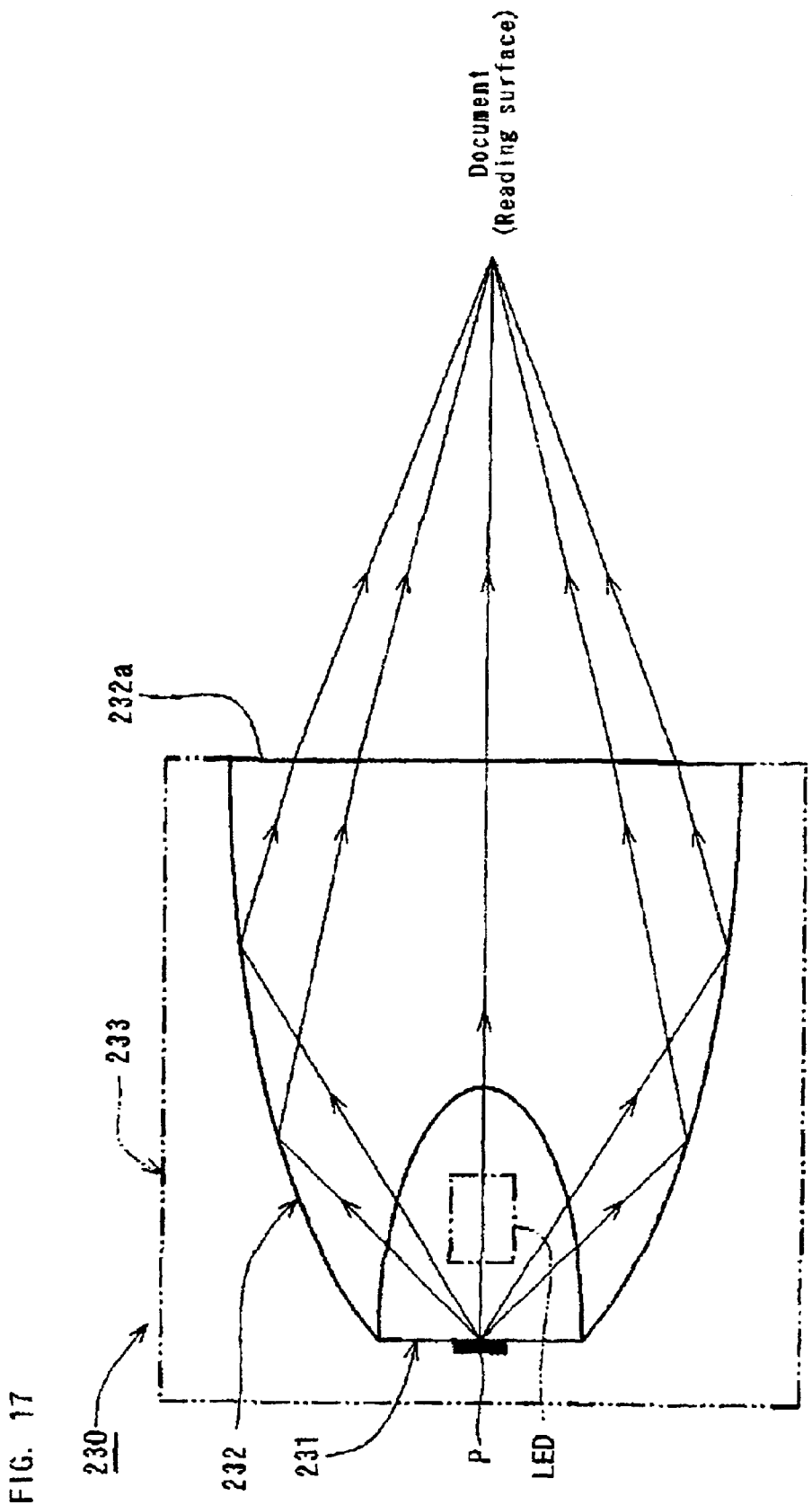
FIG. 17 is a cross-sectional view showing a third embodiment of a line-illuminating device according to the second invention group of the present application.

FIG. 17 is a cross-sectional view showing a third embodiment of a line-illuminating device according to the invention which belongs to the second group. The line-illuminating device 230 shown in FIG. 17 comprises a light guide section 231 of which the cross-sectional shape is substantially ½ oval, a light condensing section 232 formed by cutting the light guide section 231, a light guide casing 233 for covering the light guide section 231 and the light condensing section 232, a light-emitting source LED provided on end surfaces of the light guide section 231 in the longitudinal direction, and a light-emitting source base plate (not shown) provided with the light-emitting source LED. The light guide casing 233 may be eliminated. Light scattering patterns P are provided at a focal position of an oval on a plane parallel to a minor axis of the oval of the light guide section 231. The light condensing section 232 can be easily formed because the section in which the light guide section 231 is fitted is cut.

Light from the light-emitting source LED propagates through the light guide section 231. Light scattered by the light scattering patterns P is caused to enter the light condensing section 232 and is reflected by the reflecting curved plane (the oval plane) of the light condensing section 232. The reflected light is then emitted from the emission plane 232a and condensed on the document reading surface.

Figure 18:
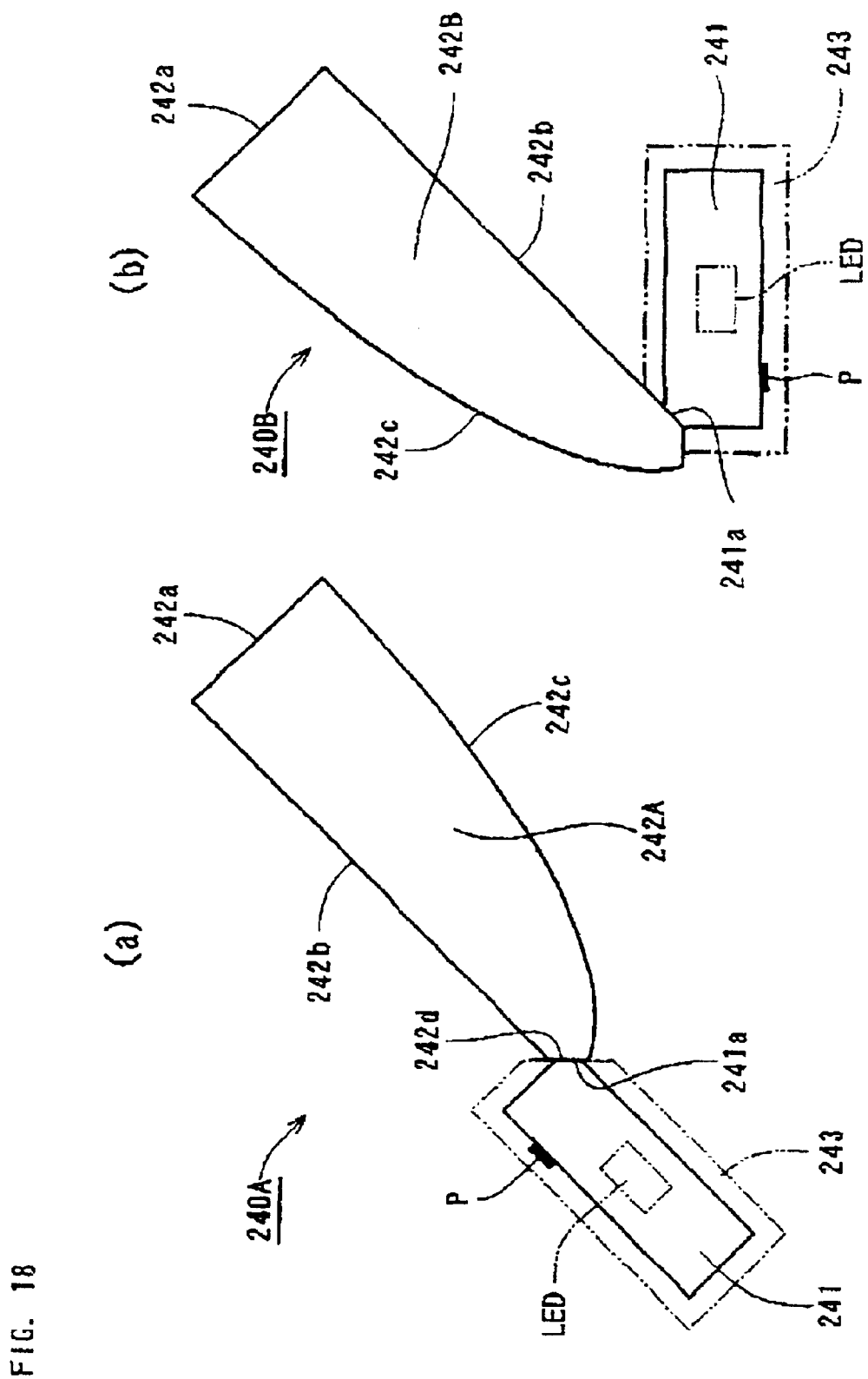
FIG. 18 is a cross-sectional view showing a fourth embodiment of a line-illuminating device according to the second invention group of the present application.

FIG. 18 is a view showing a fourth embodiment of the line-illuminating device according to the invention which belongs to the second group. In the line-illuminating device 240A shown in FIG. 18(a), a light condensing section 242A is provided in which a focal position of a reflecting curved plane (an oval plane) 242c is formed on a chamfered plane 242d and an emission plane 241a of a light guide section 241 is connected to the chamfered plane 242d. In the line-illuminating device 240B shown in FIG. 18(b), a light condensing section 242B is provided in which a focal position of a reflecting curved plane (the oval plane) 242c is formed on an end of a plane 242b parallel to a major axis of the oval and an emission plane 241a of a light guide section 241 is connected to the focal position of the oval. The light guide section 241 has a substantially rectangular cross-section in the longitudinal direction. The emission plane 241a for the scattered light is formed by chamfering a corner section of the light guide section 241 and light scattering patterns P are formed on a plane facing the emission plane 241a. Provided on an end surface of the light guide section 241 in the longitudinal direction are a light-emitting source LED (shown by an imaginary line) and a light-emitting source base plate (not shown) provided with the light-emitting source LED. In FIG. 18, the light guide section 241 of which the cross-sectional shape is substantially rectangular is shown as an example, but the light guide section 241 may be formed in other shapes.

The line-illuminating devices 240A and 240B are arranged so that the light condensing sections 242A and 242B and the light guide section 241 is covered by a light guide casing (not shown) except for the emission plane 242a of the light condensing sections 242A and 242B. It is also possible to cover only the light guide section 241 by the light guide casing 243 as shown by an imaginary line.

Figure 19:
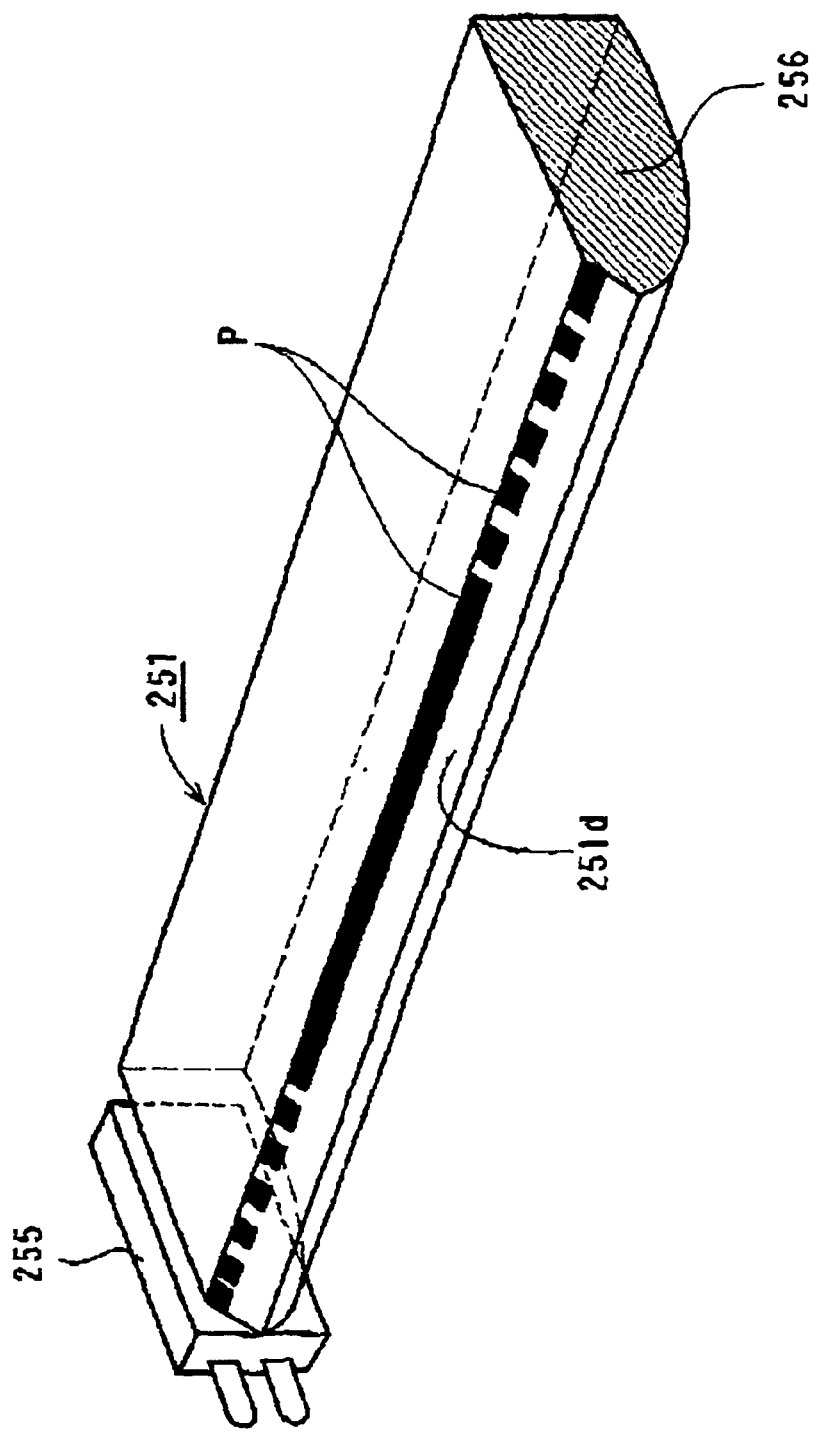
FIG. 19 is a perspective view of another embodiment of a light guide section which is incorporated in the line-illuminating device according to the second invention group of the present application.

FIG. 19 is a perspective view of another embodiment of the light guide which is incorporated in the line-illuminating device according to the invention which belongs to the second group. In this embodiment, a light-emitting source 255 such as an LED is provided on one end of the light guide section 251 and a reflecting means 256 is provided on the other end thereof. An aluminum tape, plating, mirror finish or the like is considered as the reflecting means 256.

A chamfered surface 251d formed along the longitudinal direction of the light guide section is provided with light scattering patterns P which are formed by a means such as printing white coating materials. The light scattering patterns P are formed as a continuous pattern at the middle section of the longitudinal direction, but they are formed as a discontinuous pattern near the light-emitting source 255 and the reflecting means 256. The patterns are caused to be so dark at the middle section and light at both ends to provide the uniform light quantity because the quantity of light is increased more near the light-emitting source 255 and the reflecting means 256 than at the middle section.

Figure 20:
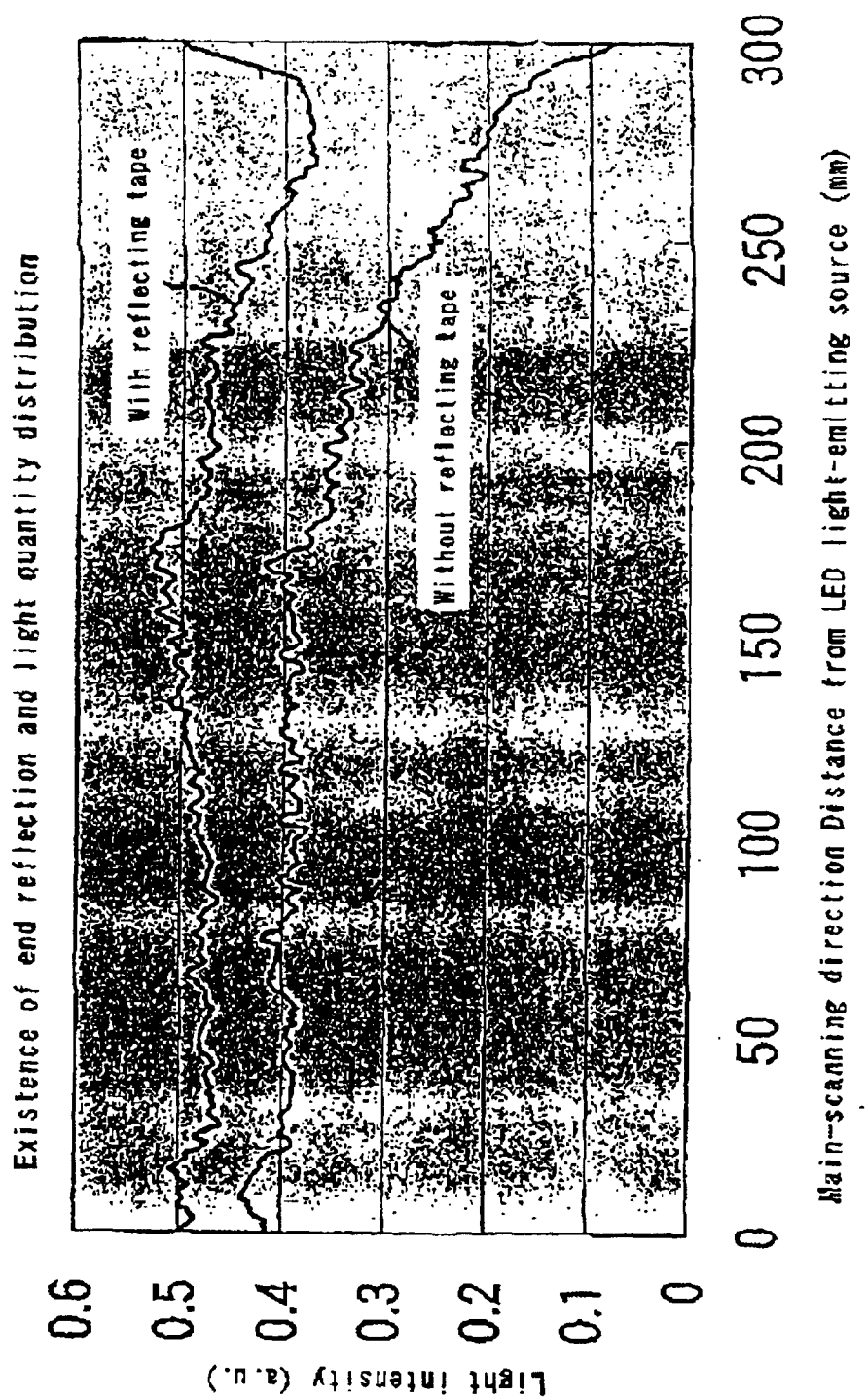
FIG. 20 is a graph showing the relationship between a distance from a light source and light intensity when the light guide section shown in FIG. 19 is used.

FIG. 20 is a graph showing the relationship between distance from the light-emitting source and intensity when the light guide section shown in FIG. 19 and the light guide section which is not provided with the reflecting means are used. It is obvious from this graph that when one end of the light guide section is provided with the light-emitting source and the other end thereof is not provided with the reflecting means, the light intensity decreases remarkably at the other end. On the contrary, if the other end is provided with the reflecting means, decrease of light intensity can be controlled considerably.

Figure 21:
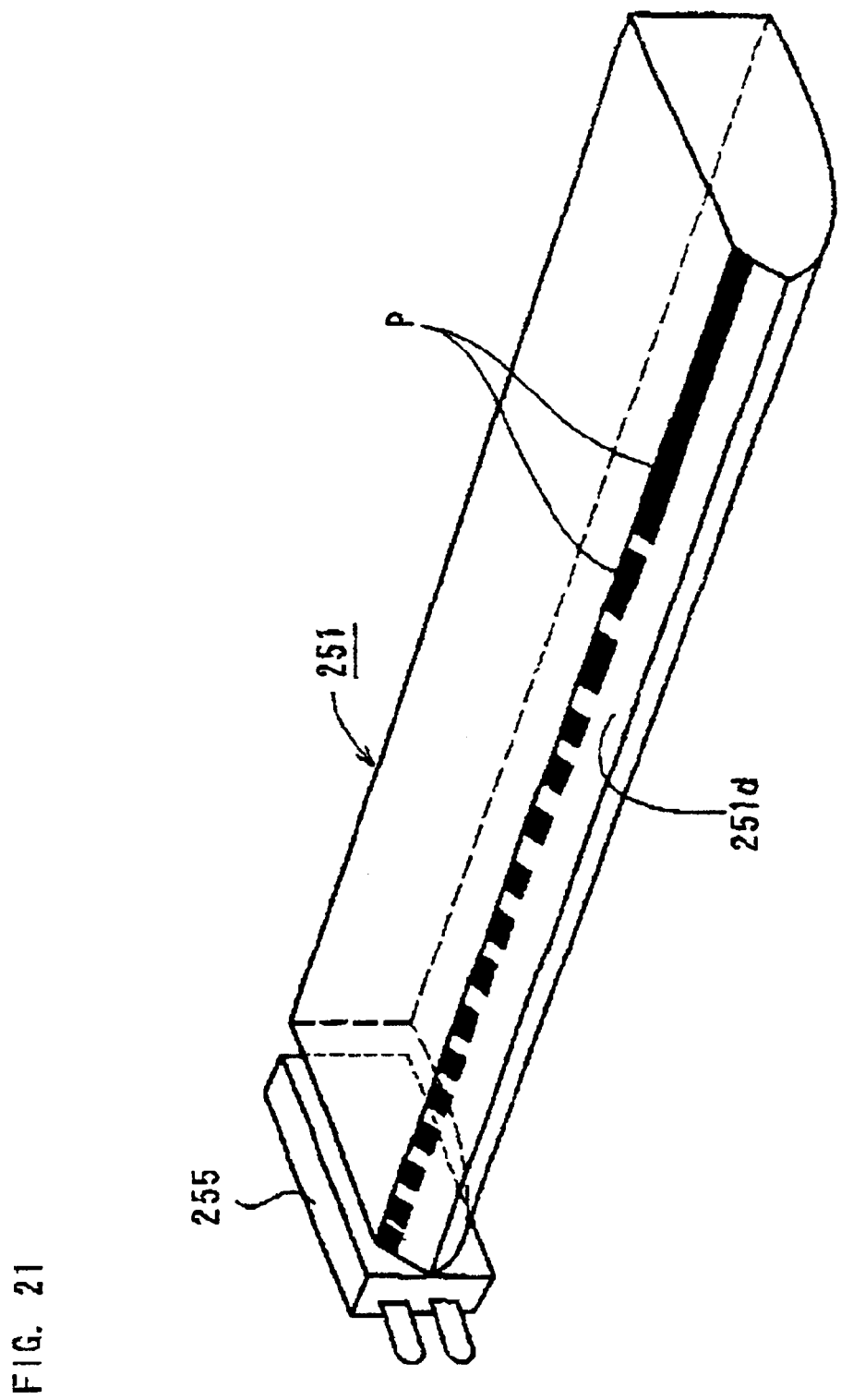
FIG. 21 is a perspective view of a still further embodiment of a light guide section which is incorporated in the line-illuminating device according to the second invention group of the present application.
Figure 22:
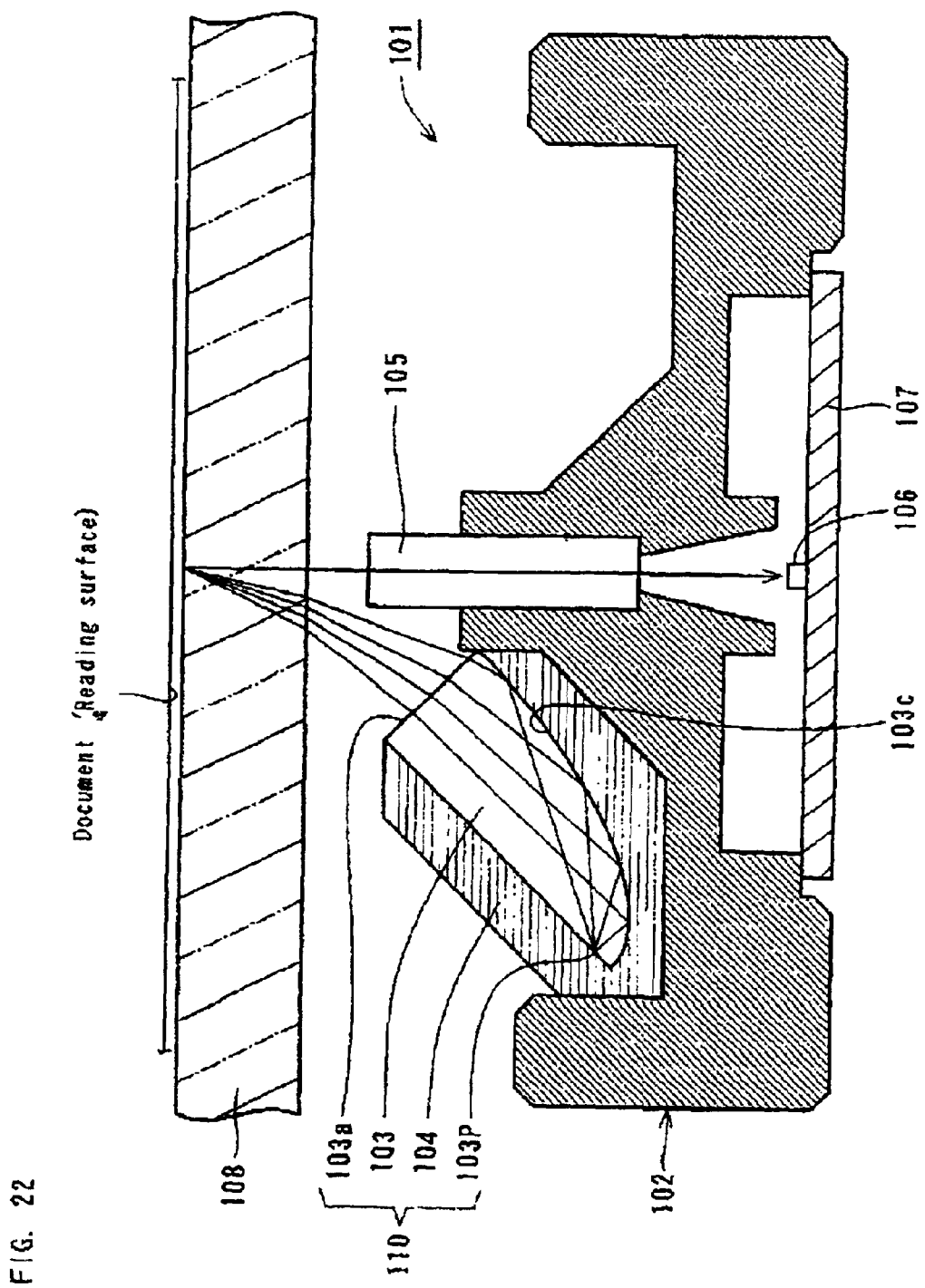
FIG. 22 is a cross-sectional view of a contact-type image sensor which was previously developed by the present inventor.

FIG. 21 is a perspective view of a still further embodiment of the light guide section, in which one end of the light guide section 251 is provided with the light-emitting source 255, but the other thereof is not provided with the reflecting means. Instead, in this embodiment, density of the light scattering patterns P is gradually increased toward the other end of the light guide section.

With this construction, almost all the light entering the light guide section 251 from the light-emitting source is caused to reflect by the light scattering patterns P before it reaches the other end of the light guide section 251. Accordingly, the amount of light returning through the inside of the light guide section after being reflected at the other end is extremely reduced and as a result, the quantity of reflected light in the longitudinal direction of the light guide section is uniform.

As described above, in the line-illuminating device according to the second group, the light guide section for guiding the light from the light-emitting source to the longitudinal direction (i.e. the main-scanning direction) and for allowing the scattered light to be generated by the light-scattering patterns, and the light condensing section for allowing the scattered light emitted from this light guide section to be condensed on the document reading surface are independently formed, and the light guide section and the light condensing section are arranged in contact with each other or they are closely arranged. Accordingly, it is possible to narrow the cross-sectional area of the light guide section and to improve the density of light propagated through the light guide section. Thus, it is also possible to improve intensity of the scattered light without increasing the pattern width of the light scattering patterns. Further, the light condensing section is only required to provide a function for allowing the scattered light emitted from the light guide section to be condensed on the document reading surface. Accordingly, it is possible to set the size and shape of the light condensing section taking only the condensing efficiency into account. As a result, the condensing efficiency can be improved.

What is claimed is:

1. A bar-shaped light guide designed to allow an illuminating light incident from an end surface to be reflected by the inner surface and to emit the illuminating light from an emission plane formed along the longitudinal direction, characterized in that the cross-sectional shape of the bar-shaped light guide in the direction perpendicular to its longitudinal direction is substantially ¼ oval of which the end of the major axis side is chamfered, and a side of the bar-shaped light guide along the longitudinal direction comprises an emission plane parallel to a minor axis direction of the oval, a plane parallel to the major axis direction of the oval, a light scattering plane provided with light scattering patterns on a plane formed by chamfering the end of the major axis side of said ¼ oval, and a reflecting curved plane for reflecting scattered light from the light scattering patterns toward the emission plane, said end of the major axis of the ¼ oval shape of the bar-shaped light guide is chamfered at a non-perpendicular angle to said plane parallel to the major axis of the ¼ oval.

2. The bar-shaped light guide according to claim 1, wherein the plane parallel to the major axis direction of said oval is chamfered to include a focal position.

3. A line-illuminating device incorporated with the bar-shaped light guide according to claim 1, wherein said bar-shaped light guide is housed in a casing so that the emission plane is exposed, at least one end of the bar-shaped light guide is provided with a light-emitting means, and said light scattering patterns are provided so that an area forming the light scattering patterns is larger in proportion to the distance from the light-emitting means.

4. A line-illuminating device comprising a light guide section and a light condensing section, the light guide section being arranged to guide light from a light-emitting source incident from an end surface to the longitudinal direction, to allow the light to be scattered by light scattering patterns formed along the longitudinal direction, and to allow the scattered light to be emitted from an emission plane formed along the longitudinal direction, and the light condensing section being arranged to allow the light emitted from the emission plane of said light guide section to be condensed on a document reading surface, wherein said light guide section and said light condensing section are arranged in contact with each other or they are closely arranged.

5. The line-illuminating device according to claim 4, wherein said light condensing section is provided with a reflecting curved plane for allowing the light emitted from the emission plane of said light guide section to be reflected and allowing the reflected light to be condensed on the document reading surface.

6. The line-illuminating device according to claim 5, wherein said reflecting curved plane is an oval plane.

7. The line-illuminating device according to claim 4, wherein said light guide section and said light condensing section are covered by a light guide casing except the emission plane for the document illuminating light.

8. The line-illuminating device according to claim 4, wherein one end of said light guide section is provided with a light source and the other end thereof is provided with a reflecting means.

9. The line-illuminating device according to claim 4, wherein one end of said light guide section is provided with the light source, and density of the light scattering patterns formed in the longitudinal direction of said light guide section is gradually increased toward the other end of the light guide section.

10. A contact-type image sensor provided with a line-illuminating device in which the bar-shaped light guide according to claim 1 is incorporated, and a lens array for allowing light reflected from a document among the illuminating light from said line-illuminating device to be condensed toward a line image sensor made of a photoelectric conversion element, characterized in that said lens array is composed of a plurality of rod lenses, and an optical axis of said lens array is arranged in an area with less change of light intensity relative to elevation of the document.

* * * * *